United States Patent [19]
Veijola et al.

[11] Patent Number: 6,128,509
[45] Date of Patent: Oct. 3, 2000

[54] INTELLIGENT SERVICE INTERFACE AND MESSAGING PROTOCOL FOR COUPLING A MOBILE STATION TO PERIPHERAL DEVICES

[75] Inventors: Mia Veijola, Salo; Aimo Alaniemi, Oulu, both of Finland; Andrew Turner, Camberley, United Kingdom

[73] Assignee: Nokia Mobile Phone Limited, Espoo, Finland

[21] Appl. No.: 08/965,670

[22] Filed: Nov. 7, 1997

[51] Int. Cl.[7] .................................................. H04Q 7/20
[52] U.S. Cl. ........................ 455/556; 455/557; 455/403; 710/15
[58] Field of Search ............................ 370/913; 455/403, 455/422, 550, 556–558; 364/705.05; 395/680–684; 709/203; 707/103; 710/15

[56] References Cited

U.S. PATENT DOCUMENTS

| | | | |
|---|---|---|---|
| 5,276,680 | 1/1994 | Messenger | 455/517 X |
| 5,297,142 | 3/1994 | Paggeot et al. | 455/557 X |
| 5,450,472 | 9/1995 | Brax | 455/557 |
| 5,479,479 | 12/1995 | Braitberg et al. | 455/557 X |
| 5,526,489 | 6/1996 | Nilakantan et al. | 395/200.02 |
| 5,568,536 | 10/1996 | Tiller et al. | 455/557 |
| 5,727,057 | 3/1998 | Emery et al. | 455/456 X |
| 5,835,862 | 11/1998 | Nykanen et al. | 455/558 |
| 5,870,680 | 2/1999 | Guerlin et al. | 455/557 |
| 5,884,190 | 3/1999 | Lintula et al. | 455/557 |
| 6,021,331 | 2/2000 | Cooper et al. | 455/507 |

FOREIGN PATENT DOCUMENTS

| | | |
|---|---|---|
| 0 282 197 A2 | 9/1988 | European Pat. Off. . |
| 2 289 555 | 11/1995 | United Kingdom . |
| WO 94/24775 | 10/1994 | WIPO . |
| 97/00591 | 1/1997 | WIPO . |
| WO 97/32439 | 9/1997 | WIPO . |

*Primary Examiner*—William G. Trost
*Attorney, Agent, or Firm*—Ohlandt, Greeley, Ruggiero & Perle, L.L.P.

[57] ABSTRACT

A communications system has a radio unit that includes a plurality of applications, a plurality of servers each associated with a resource of the radio unit, and a connectivity layer interposed between the plurality of applications and the plurality of servers for selectively coupling the applications to the servers. The system further includes at least one accessory device that is coupled to the radio unit through the connectivity layer. The at least one accessory device has at least one application and at least one server associated with a resource of the accessory device. At least one of an application or a server of the radio unit can be coupled to the at least one server of the accessory device or a server of the radio unit through the connectivity layer in response to a Resource Request message sent from the at least one application or server of the radio unit. The Resource Request message is routed through the connectivity layer.

28 Claims, 15 Drawing Sheets

FIG. 3
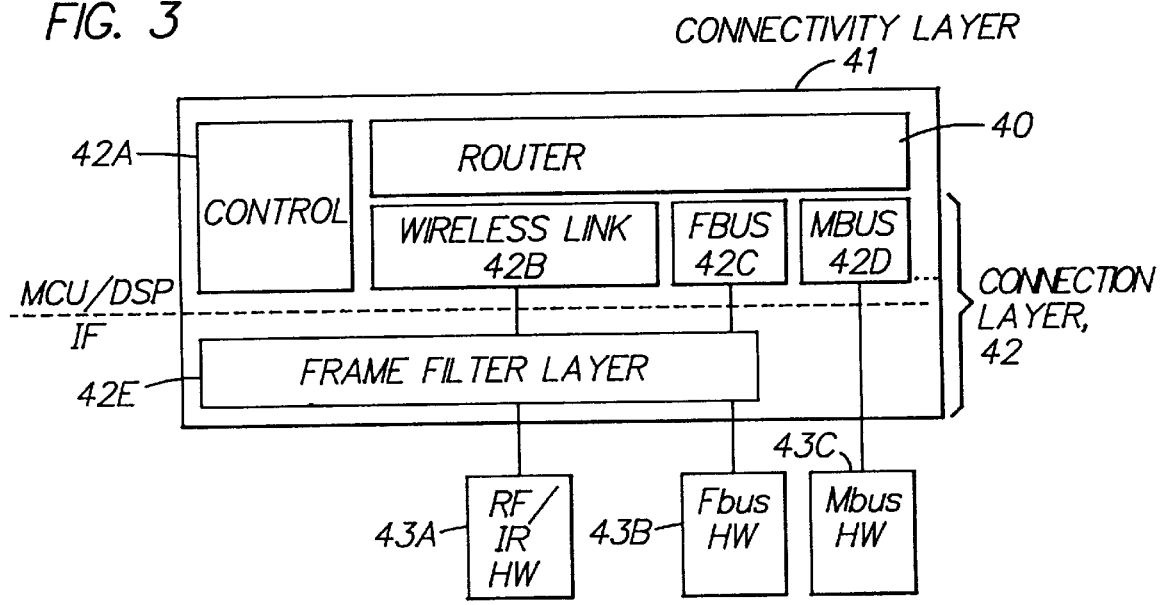
FIG. 4
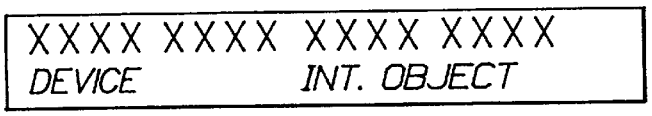
| PIPE MASTER | | | PIPE TARGET | |
|---|---|---|---|---|
| DEVICE | OBJECT | MEDIA | DEVICE | OBJECT |
| 04 | 01 | IR | 03 | 01 |
| 04 | 02 | bus | 06 | 02 |
| 04 | 06 | IR | 06 | 06 |
FIG. 5

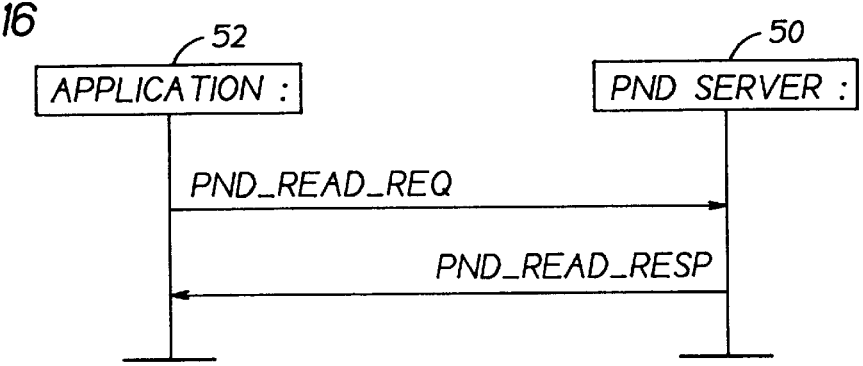
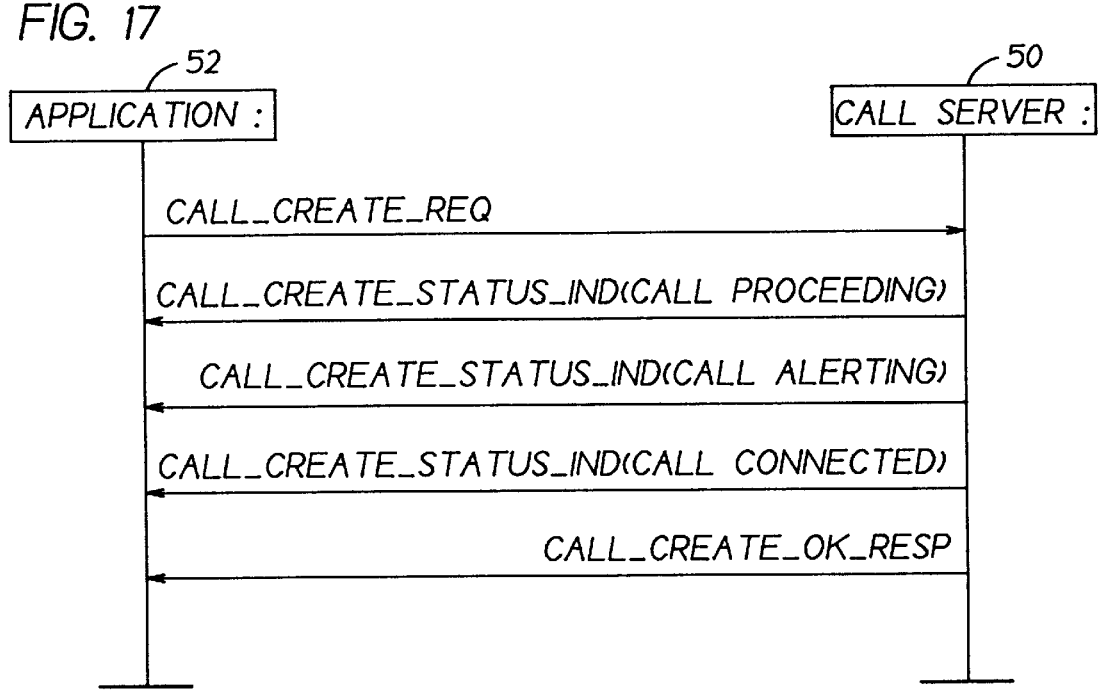
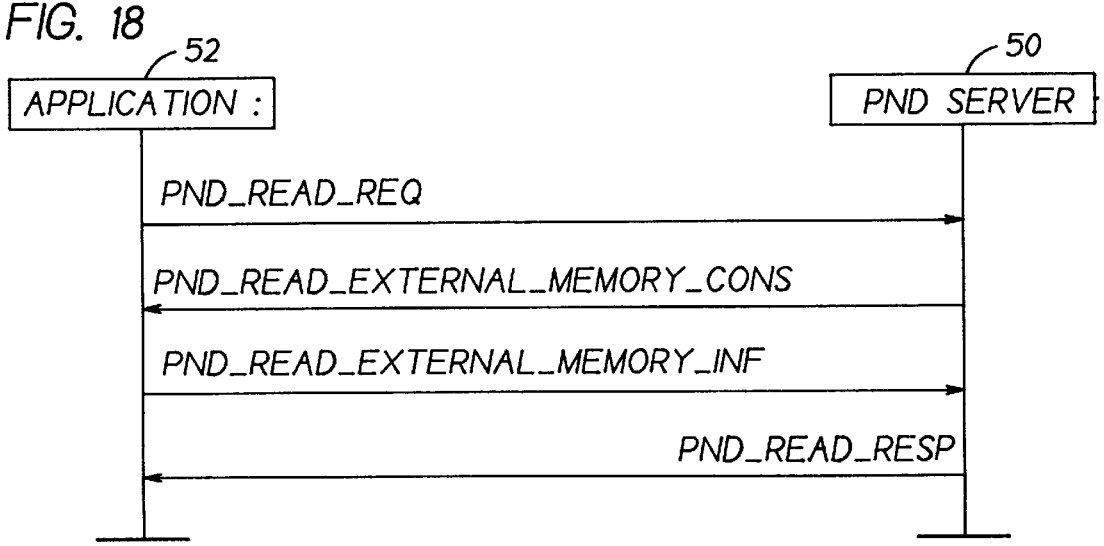

INTELLIGENT SERVICE INTERFACE AND MESSAGING PROTOCOL FOR COUPLING A MOBILE STATION TO PERIPHERAL DEVICES

FIELD OF THE INVENTION

This invention relates generally to radiotelephones and, in particular, to radiotelephones or mobile stations such as those capable of operation with a cellular network and that are further capable of being coupled to one or more peripheral devices.

BACKGROUND OF THE INVENTION

The concept of a telephone or phone that is meant only for voice conversation is becoming antiquated due to the expanding role of the phone as a generic device for exchanging information by being connected to personal computers (PCs) and other devices through intelligent accessories. It can be appreciated that this development has created a need to hide the complexities of the actual underlying devices from a user, so as to make only the desired service(s) available and visible to the user.

Due in part to the explosive growth in the cellular telephone and related markets, there has developed a need for physically connecting wireless telephones or radiotelephones, also referred to as mobile stations, to one or more intelligent accessories via a wired or wireless connection, such as through an infrared (IR) link or some other wireless communications medium such as low level radio frequency (RF) signals.

While some limited functionality exists today in this area, the existing approaches that are known to the inventors do not provide a satisfactory solution to the problem of isolating the user from the underlying hardware/software complexities.

A further problem that has arisen relates to the development of hardware, software and interfaces for providing new and enhanced functionality for mobile stations. As can be appreciated, it is undesirable for a number of reasons to completely or even partially reengineer portions of the mobile station and/or accessory software when it is desired to add a capability to interface with a new external device.

Related to the foregoing, it is undesirable to require modifications when going from a point to point configuration, such as a mobile station connected to one external device, when the mobile station is to be simultaneously connected to a plurality of external devices (a multipoint configuration).

OBJECTS AND ADVANTAGES OF THE INVENTION

It is thus a first object and advantage of this invention to provide an improved interface between a mobile station, such as a cellular telephone or personal communicator, and one or more external devices.

It is another object and advantage of this invention to provide message passing router and connection functions for facilitating a seamless integration of a mobile station with one or more external devices through a selected type of mobile station interface.

It is a further object and advantage of this invention to provide a modular software protocol to ensure that different devices and applications, as well as physical transferring media, can be implemented without requiring major changes to the mobile station's main protocol software.

It is one more object and advantage of this invention to provide multipoint connection capability for a mobile station, and to further specify a group of configuration functions that make the software protocol more flexible.

SUMMARY OF THE INVENTION

The foregoing and other problems are overcome and the objects of the invention are realized by methods and apparatus in accordance with embodiments of this invention.

A communications system is disclosed that includes a radio unit device having a main message router, a plurality of internal objects, and a plurality of links. At least one of the links is for passing messages between the internal objects. The communications system further includes at least one external device having a message sub-router and at least one external object. The at least one external device is bidirectionally coupled to at least one of the plurality of links. The main message router is operable to receive registration requests from the internal objects, the at least one external device, and the at least one external object. The registration request may include a link preference for registering devices and objects.

One of the messages is a Resource Request message for indicating a desire to obtain access to a resource of the radio unit device or the external device, and another of the messages is a Response message that is sent from a server responsible for the resource to the originator of the Resource Request message. The Resource Request message can be sent by one of an application or a server. Another one of the messages is an Indication message that is sent from the server responsible for the resource for indicating one of an event or a status associated with the resource. Another one of the messages is a Consult Request message that is sent from the server responsible for the resource for requesting additional information in order to complete an action dictated by the Resource Request message. A further message is an Inform Response message that is sent from the originator of the Resource Request message in response to receiving the Consult Request message.

This invention also includes a communications system having a radio unit that includes a plurality of applications, a plurality of servers each associated with a resource of the radio unit, and a connectivity layer interposed between the plurality of applications and the plurality of servers for selectively coupling the applications to the servers. The system further includes at least one accessory device that is coupled to the radio unit through the connectivity layer. The at least one accessory device has at least one application and at least one server associated with a resource of the accessory device. At least one of an application or a server of the radio unit can be coupled to the at least one server of the accessory device or a server of the radio unit through the connectivity layer in response to a Resource Request message sent from the at least one application or server of the radio unit. The Resource Request message is routed through the connectivity layer.

BRIEF DESCRIPTION OF THE DRAWINGS

The above set forth and other features of the invention are made more apparent in the ensuing Detailed Description of the Invention when read in conjunction with the attached Drawings, wherein:

FIG. 3 is a simplified block diagram that illustrates a router layer and a connection layer that form a part of a Phone and network, Peripheral host-object Network (PhoNet) system in accordance with this invention;

FIG. 4 illustrates a format of a logical address used in the PhoNet system;

FIGS. 5 and 6 are useful in understanding the operation of PhoNet message pipes;

FIG. 16 is an exemplary transaction chart for a case where an application makes a resource request to a Phone Number Directory (PND) server;

FIG. 17 is an exemplary transaction chart for a case where an application makes a resource request to a Call Server;

FIG. 18 is an exemplary transaction chart for a case where an application makes a resource request to the PND server, wherein the PND determines that it must obtain permission from the application to proceed;

DETAILED DESCRIPTION OF THE INVENTION

The following list of abbreviations and acronyms will be useful when reading the description of the invention that follows, in particular the description of a Phone and Network, Peripheral Host-Object Network (PhoNet).

| | |
|---|---|
| AMPS | Advanced Mobile Phone Service |
| CS | Cellular System |
| Connection layer | Lower layer of PhoNet, which includes a group of physical transferring media modules such as infrared (IR), RF or bus modules. |
| Device | A physical device that holds applications (i.e. accessories, MS) |
| DSP | Digital Signal Processor/processing |
| ECI | External Control Interface, a general term for the ISI and VAS. Includes services, devices, and generally the entire connecting concept. |
| External object | An object that can be accessed using PhoNet and some physical media |
| FBUS | Fast two wire asynchronous message bus connected to DSP |
| GSM | Global System for Mobile Communications |
| Host | Device including PhoNet main router |
| ISI | Intelligent Service Interface |
| Internal object | An object within the same processor that can be accessed by using the OS, such as Infrared |
| Link | Equivalent to a physical transferring media |
| MBUS | Media module and one physical media of PhoNet |
| MDI | MCU/DSP Interface |
| Media module | Lower levels of PhoNet. A media module is a module that performs the needed operations for message passing through certain media such as IR, RF or any bus. Media modules are in the Connection layer of PhoNet. |
| MS | A Mobile Station, such as a cellular telephone, a PCS telephone, a wireless telephone, a personal communicator, or a PC module or card such as a PCMCIA card. |
| Object | An application located in an external device, or a module within the same processor such as the ISI, CS or UI |
| OS | Operating System |
| RPC | Remote Procedure call |
| RF | Radio Frequency |
| Router, router layer | The core element of PhoNet |
| SIM | Subscriber Identity Module |
| Slave | A device that includes a PhoNet sub-router |
| Transferring media | A media that delivers PhoNet messages. (e.g., IR, RF, wire) |
| UI | User interface |
| VAS | Value Added Service |

Figure 1:
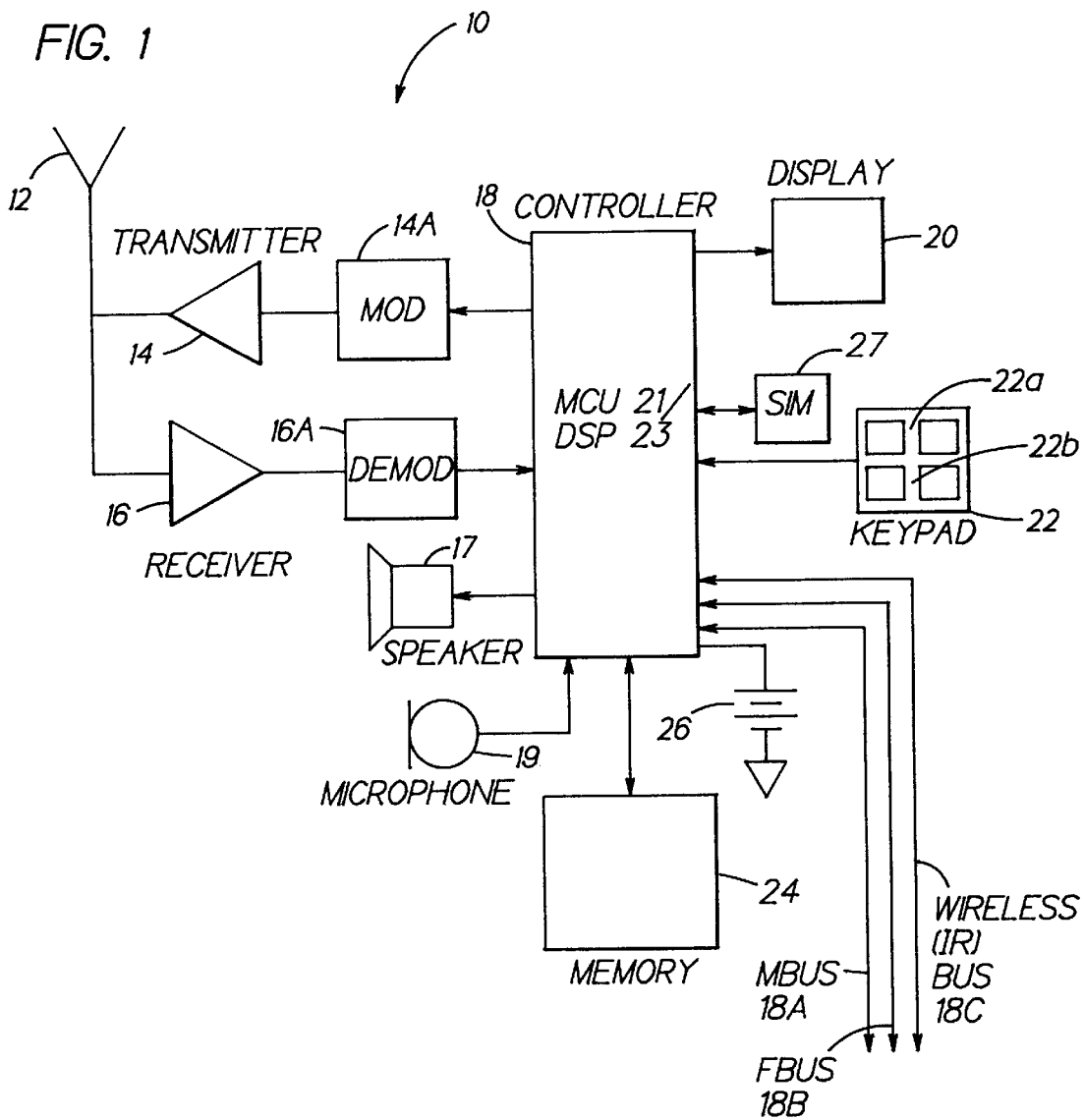
FIG. 1 is a block diagram of a mobile station that is constructed and operated in accordance with this invention.
Figure 2:
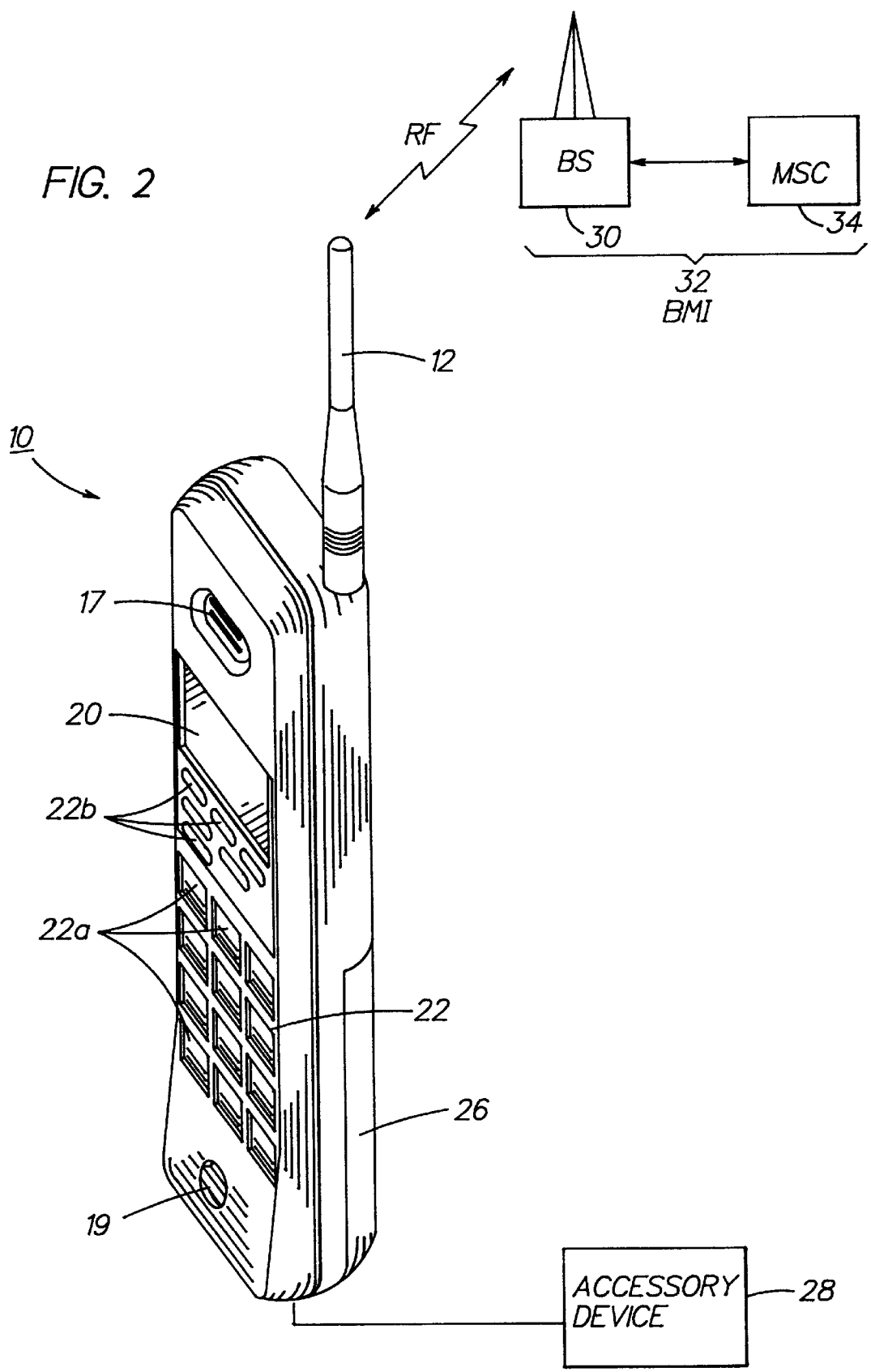
FIG. 2 is an elevational view of the mobile station shown in FIG. 1, and which further illustrates a cellular communication system to which the mobile station is bidirectionally coupled through wireless RF links.

Reference is made to FIGS. 1 and 2 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a base site or base station 30. The base station 30 may be part of a cellular network comprising a Base Station/Mobile Switching Center/Interworking function (BMI) 32 that includes a mobile switching center (MSC) 34. The MSC 34 provides a connection to landline trunks when the mobile station 10 is involved in a call.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular or other system, and also user speech and/or user generated data. The specifics of the air interface standard are not germane to the operation or understanding of this invention and will not be further discussed.

It is understood that the controller 18 may also include the circuitry required for implementing the audio and logic functions of the mobile station. By example, the controller 18 may be comprised of a Master Control Unit (MCU) 21, typically a microprocessor device, and a Digital Signal Processor (DSP) 23 which communicate with one another across a MCU/DSP Interface (IF). The controller 18 may further comprise various analog to digital converters, digital to analog converters, and other support circuits. The control and signal processing functions of the mobile station 10 are allocated between these devices according to their respective capabilities.

A plurality of buses, such as an asynchronous message bus (MBUS) 18A, connected to the MCU 21, a fast, asynchronous message bus (FBUS) 18B, connected to the DSP 23, and a wireless bus 18C, such as an infrared (IR) or a low power RF link, are also provided for interfacing to external devices, such as an accessory device 28 shown in FIG. 2. Examples of accessory devices 28 include, but are not limited to, personal computers, personal communicators, external radio units, and devices such as voice recorders, pagers, an external handset, and vehicle accessories. More than one accessory device 28 can be connected to the mobile station 10, as discussed below.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user. A removable SIM 27 may also be provided for storing certain mobile station 10 information.

It should be understood that the mobile station 10 can be a vehicle mounted, a handheld device, or embodied in any suitable form, such as card that plugs into a slot (e.g., a PCMCIA slot) of a personal or other type of computer.

It should further be appreciated that the mobile station 10 can be capable of operating with one or more air interface standards, modulation types, and access types, such as TDMA, CDMA, and analog (FM).

The operating program in the memory 24 includes software for implementing the PhoNet system as described in detail below.

Referring to FIG. 3, the PhoNet in accordance with this invention includes two separated function layers referred to as the router layer 40 and the connection layer 42, which together may be referred to as a connectivity layer 41. The connection layer 42 includes a control module 42A as well as link specific media modules, specifically a wireless media module 42B, a FBUS media module 42C, and a MBUS media module 42D. The router 40 and control and media modules 42A–42D may reside in the MCU 21, while a frame filter layer 42E, also part of the connection layer 42, may reside in the DSP 23. Wireless (e.g., IR or RF), FBUS and MBUS hardware (HW) modules 43A–43C are connected to their respective buses for providing the necessary hardware and physical interfaces to external devices.

The layer structure depicted in FIG. 3 is defined to ensure hardware independence, as well as to achieve the desired modularity for the PhoNet.

The router layer 40 includes a router module whose primary function is to provide message routing and information about connected devices and objects, as well as to enable sophisticated configuration changes available. The router layer 40 includes logic to pass the messages in an optimized way to the different physical transferring media modules 43.

The control module 42A of the connection layer 42 acts as a gate through the MDI to the DSP SW for sending control messages. The control module 42A holds a group of common configuration functions that are not link specific, but that are instead common to all links. It also grants a pipe transfer by separated control messages, as discussed below. Also, possible protocol filter usage by different devices can be determined from the control module 42A.

The media modules 42B–42D convert general router 40 messages to the required physical transferring media. A given media module is an interface to the associated hardware module 43. Although three different media modules are shown in FIG. 3, more or less than this number can be used, and new media modules 42, and associated hardware modules 43, can be defined as required. The media modules 42A–42C preferably include message re-transmission and acknowledgment features. Each also contains any required I/O buffers for storing messages and data passing through the link.

The frame filter module 42E converts the PhoNet frame structure format to another frame structure if required. Preferably the conversion is accomplished by the higher speed DSP 23 software.

The router 40 can be considered as the core of PhoNet by providing message routing as a main service. The router 40 also performs other services such as configuration change and query, as well providing information about the connected devices and objects.

PhoNet is defined to have one main router 40 associated with a host. Typically the main router 40 is located in the mobile station 10. Only the main router 40 provides complete message routing services. The router 40 optimizes the usage of physical transferring media. The router 40 supervises the status and loading level of physical links, and can select a most optimized (fastest) way to pass a given message. Several sub-routers or slaves can also be connected to system. A sub-router typically has a subset of the functionality of the main router 40.

Features of the router 40, which is configurable and scaleable, include the following:

(A) The router 40 performs a conversion from logical addresses to physical addresses.

(B) The router 40 enables one logical address can be mapped to several physical addresses (e.g., the mobile station's user interface can send one message to a plurality of applications.)

(C) The main router 40 can provide routing by function.

(D) The router 40 can perform default address mapping/dynamic configuration, as well as configuration query.

(E) The router 40 can provide for physical addresses (media) to have different priorities.

(F) The router 40 provides a signaling mechanism between the router layer and the connection layer 42 (e.g., media availability and status).

(G) The router 40 provides clear interfaces between the router 40 and devices and objects, between the router 40 and the connection layer 42, and between the connection layer 42 and the physical media 43.

(H) The router 40 provides a clear interface to router configuration changes and queries.

(I) The router 40 provides for the storing of information concerning connected devices and objects, and also provides for Remote Procedure Calls (RPCs), without parameter count limitations.

(J) The router 40 also provides a capability to configure the router to give information concerning disconnections to the desired interfaces.

For the main router 40, located in the host (e.g., the mobile station 10), message routing basically entails routing a message according to function to some logical address, and converting the logical address to a physical address that includes information of what physical link to use. Messages can be sent to some function without knowing the logical address, or directly to some known logical address. The main router 40 updates information about different functions: such as (a) links available by system; (b) connected devices and their links; (c) information concerning logged-in devices and their link preferences; (d) routing information for object tasks such as ISI, UI or the CS; and (e) information concerning active pipes.

Considering these now in greater detail, and for the links available by system (a), the links can have one of three different states: (1) active; (2) busy (can't be used), and not available. Table 1 shows an exemplary link status condition.

TABLE 1

| Link | Status |
| --- | --- |
| MBUS | active |
| FBUS | active |
| IR | busy |
| RF | not available |

With respect to the connected devices and their links (b), the main router 40 stores information about all devices that are available and which of the devices are currently active. It also stores link loading level information to provide an optimized way to pass messages, such that if a desired link is loaded then a message will be routed to another, available link. Table 2 illustrates information regarding device status and the links they use, as well as pointers to object tables. The "pointer" column contains pointers to Table 1 for obtaining status information. The "media" column indicates preferred media (see Table 3), or the media that the associated device first registered on if no preferred media is given.

TABLE 2

| device | media | status | pointer | | | object ptr |
| --- | --- | --- | --- | --- | --- | --- |
| 01 | IR | active | MBUS | FBUS | RF | ptr1 . . . |
| 02 | IR | active | FBUS | | | ptr2 . . . |
| 03 | RF | inactive | IR | RF | | NULL |
| 04 | FBUS | active | IR | | | NULL |

Table 3 depicts exemplary information about device logged-in objects and their link preferences (c).

TABLE 3

| object | link preference |
| --- | --- |
| 01 | MBUS |
| 02 | MBUS |
| 03 | FBUS |
| 04 | IR |
| 05 | no preference |
| 06 | RF |
| 07 | MBUS |
| 08 | FBUS |

With respect to routing information for an inner object task such as ISI, UI or the CS, Table 4 shows one exemplary configuration.

TABLE 4

| function | addr1 (logical addr) | addr2 . . . (physical addr.) |
| --- | --- | --- |
| ISI | 0001 | 0203 |
| LOC | 0002 | |
| CS | | |
| AUD | 708 | 07 |

By way of explanation, a given PhoNet message can be delivered to the "inner" objects of the mobile station 10, such as the cellular system (CS) module, user interface (UI) module, audio software module, or ISI module. Since these objects are not owned necessary by any device, and neither do they use any links for communication, the special inner object table (Table 4) is provided for communication with these modules by converting a logic address of the module to a physical address. Table 4 is thus used by the router 40 when the function of a message refers to an inner object.

Finally, and with regard to the information concerning the active pipes (e), the router 40 can set up a fast message link or pipe between different devices or objects. A pipe can be set up using the wireless media, the FBUS, or the MBUS. Once the pipe becomes active, two objects can communicate with each other without having the router 40 involved. That is, the two objects can transfer 'pure' data without employing a router-recognized frame structure. In general, the router 40 stores information about active pipes, controls the active pipes, and grants a message pipe setup to any requesting device (if a pipe is available).

Table 5 presents an exemplary "snapshot" of a current state of all PhoNet pipes, that is, the addresses of the involved devices and the link through which the pipe is established.

TABLE 5

| originator | partner | link |
|---|---|---|
| 0102 | 0205 | FBUS |
| 0104 | 0204 | IR |
| 0201 | 0703 | RF |
| 0701 | 0803 | MBUS |

In general, there are two different types of pipes. A first type of pipe allows a straight through and fast data stream from one accessory to another. A second, slower type of pipe delivers data coming from a device through the link host (not necessarily using Phonet router MCU 21 involvement) to another device.

The first type of pipe provides a mechanism for performing a fast data transfer between, for example, two DSPs (e.g., digital audio). Communication through a pipe is not visible to the host. Instead it maintains information about active pipes in a separated table (see FIGS. 5 and 6.

The second type of pipe can be used to translate data coming via a media that the receiver does not hold. For example, an accessary that has only an IR-link can transfer data to an accessory that has only an RF-link or some other bus. Protocol conversion can be used during the transfer by passing the messages through some protocol converter implemented in, by example, DSP 23 software.

When a pipe is no longer used the host must be informed that the pipe has been released. The host can also control and interrupt a given pipe. It is possible to have more than one active pipe at any given time and, as in shown in FIG. 5, to have more than one active pipe using the same media.

Figure 6:
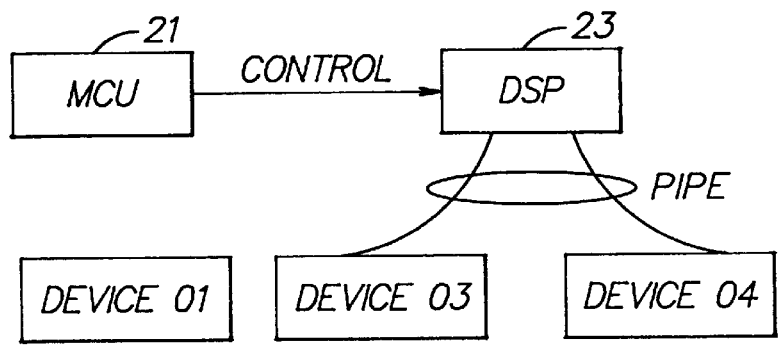

FIG. 6 illustrates the general pipe architecture, with control being exercised by the MCU 21 (the router 40), and the actual pipe being made through the DSP 23 between two devices (e.g., devices 3 and 4).

A given sub-router (located in a slave device) updates the following information: its own connection status (registering, logged in/out); the status of its own links (active/inactive, loading level, etc.); the available/active links of the host; and message routing. The basic functions related to these tasks are similar to functions of the main router 40, although the message routing is simpler, as it involves only mapping from logical addresses to physical addresses.

With regard to the router 40 configuration, there are default and dynamic routing schemes for both major router functions: routing and logical address to physical address mapping. Default routing is defined during a software compilation phase, while dynamic routing can be dynamically changed at runtime. The numbers of internal objects are preferably fixed and defined at compilation time.

A configuration query can be used to obtain information about the current default or dynamic routing. A clear interface function is provided for configuration query and change. The interface is basically a message interface (with some functions allocated for configuration purposes only). A set of service functions can be provided for building messages.

Certain features of the router 40 can be configured so as make the router scaleable according to system needs. For example, a single mode AMPS cellular phone may have very limited router functions as compared to a fully featured digital cellular phone, such as a GSM or IS-136 phone.

With regard to addressing, the preferred embodiment of this invention uses two level addresses. The logical level address contains a device number (e.g., phone, PC, etc.) and an internal object number (e.g., UI or CS). The physical level address adds information to the physical address about the media that is used.

The address space of external devices is divided into two sets. One set contains fixed device addresses (i.e., devices can have predefined addresses), while the other set of addresses are reserved for devices using the dynamic registration method disclosed herein.

If a device uses a fixed address then it is not necessary for the device to actually register with the PhoNet host, as sending a message is sufficient to inform the Host that the device is connected, unless the device wishes to inform the host about link preferences, etc. The use of fixed addresses enables the use of simple external devices that do not require a high degree of intelligence. For example, digital audio can be sent to a simple and low cost external slave device having a hardcoded fixed address such as, by example, a so-called 'hands free' unit.

A registration message in this case can simply include a fixed host address in the receiver portion and a fixed slave device address in the sender portion, and the registration response then contains the fixed slave address in the receiver portion and the fixed host address in the sender portion.

Turning now to those devices that use dynamic registration, the addressing is dynamic in that sense that some slaves do not have fixed device numbers. Device numbers are instead dynamically assigned by the PhoNet host in the registration phase. The host always owns one fixed device number. There is also one fixed address for global or broadcast type of messages, and all connected devices receive any messages addressed to the fixed broadcast address.

FIG. 4 illustrates a logical address format. According to this addressing scheme the network could contain, for example, 255 connected devices, and each connected device can hold a maximum of 256 internal objects. Preferably the internal object numbers of each device are fixed in the software compilation phase. In accordance with an aspect of this invention each device, and object within a device, can be separately addressed and can participate in a communication transaction.

There are three different states that a device address can assume: free, active, or suspended. A free address can be assigned to any new device, an active address is one that has been assigned to some connected device, and a suspended address is one that is waiting for confirmation that the associated device has logged out. An assigned address is placed in the suspended state by the router 40 when communication with the corresponding device fails. A suspended address may become active again if the corresponding device "wakes up", or becomes free after running some device recovery software, or after some predetermined timeout.

The preferred message format between the router 40 and the physical media (e.g., the IR link) is shown in Table 6, where "b" represents "bits":

TABLE 6

| media | 8b |
|---|---|
| receiver device | 8b |
| sender device | 8b |
| function | 8b |
| length | 16b |
| data(0) receiver object | 8b (optional) |
| data(1) sender object | 8b (optional) |
| . | |
| . | |

TABLE 6-continued

```
        data(n)                         8b
where:
media = e.g., IR, FBUS, MBUS
receiver = device address
sender = device address
function = message type identifier
length = number of data bytes
object = low level address, e.g., a PC application address
data = data to be transferred
```

Devices can register at system startup, whenever the device is connected to the system, and whenever required by the main router 40. Registration is performed using physical transferring media selected by the device. If the selected media is not available or functional for some reason, other physical media can be tried. The registration technique can be fully configurable such that one can select a preferred media to use for registration, and a priority for using other media if the preferred media is not available or is non-functional.

In a registration message a registering device uses a temporary address until a real device address is assigned by the main router 40. The registration message contains information about the available physical transferring media for this certain device. A registration message also contains a fixed part, such as device type, and some randomly generated part. The randomly generated portion is used to avoid conflicts when devices attempt to identify their own registration acknowledgements. A device may also suggest a preferable device number. The host (main router 40) will assign the requested device number if the device number is free.

In greater detail, a registration message sent from a device to host contains:
- a fixed host address as receiver;
- a temporary device sender address;
- a device type identifier;
- a random number;
- a preferred device number to be assigned if available; and
- information about available links.

In the registration acknowledgement message the main router 40 provides the assigned device number to the registering device and also informs the device of what physical media it has available.

In greater detail, a registration acknowledgement message sent from the host to the slave (device) contains:
- a temporary address as receiver;
- a fixed host address as sender;
- a device type identifier (from registration message);
- a random number (from registration message);
- a device number assigned by the host; and
- information about available links in the host.

The external objects owned by devices can also log into the system. If the external object wants to change, for example its routing, it first identifies itself to the host as the devices do. This object can also inform the host of what physical link it wants to use. The object registration message contains, basically, only the preferred link information. In order to set up a pipe between two external objects they must each be logged into the host.

Device connection supervision is performed in PhoNet connection layer 42. When the connection layer 42 detects that one certain device has disconnected it informs the PhoNet router 40. The router 40 then marks that device and all the external objects owned by that device as being disconnected. The address used by the device is first changed to the suspended state for indicating that this address cannot be assigned to any other device until the router 40 is assured that the device has actually logged off or disconnected from the PhoNet system. When the router 40 is certain that the device has logged out the address is changed to the free state, and can be reassigned to another device.

The router 40 provides a service for obtaining the connection information of any device. Any object can request the router 40 to automatically inform the object if a device or devices are disconnected. It is also possible for an object to employ a router 40 service function to first determine whether a needed object/device is disconnected or connected.

All routers (main router and sub-routers) support conversion from logical addresses to physical addresses. One logical address can be mapped to several physical addresses. Both default and dynamic configuration are provided.

The main router 40 is able to route messages according to function, i.e., the receiver address can be unknown. A call creation message is one example, as a call creation message can be generated without knowing where the call creation is performed or which CS (in a multi-CS phone) is active at particular moment. However, the main router 40 routes the message to the correct logical address. This routing is fully configurable so that, for example, if the CS service is switched to another system the routing is changed accordingly.

The PhoNet system includes separate security checking modules. Each logical address and routed function can be secured if desired. For example, a function or a logical address may be secured by locking it by command, and the lock can be opened only by performing certain security operations.

The connection layer 42 provides the path for the actual physical link, such as Fbus, IR or RF. Each physical media has its own low level driver for interfacing to the certain media module. The OS is also regarded as one transferring media, although it is not similar to the physical media.

The connection layer 42 includes the above-mentioned protocol converter modules (i.e., frame filter 42E) by which messages are fitted into the required frame structure. This processing is done before passing the messages to the media modules 43. The connection layer 42 may also provide an optimized message passing so that several PhoNet messages can be packed into one physical layer frame.

In general the connection layer 42 provides the following features and advantages:
 (a) provides reliable message transfer over the physical media;
 (b) is responsible for reporting link lost/found information to the router 40;
 (c) provides frame mapping to lower level protocols as required;
 (d) provides an interface to the router 40 that is fixed and equal for every lower level media module 43;
 (e) enables lower level media to be added easily to the PhoNet system;
 (f) provides a mechanism for the media modules 43 to update diagnosis of link function (for example, retransmissions, bit error rate, buffer status, etc.); and
 (g) provides the above-described frame filter 42E to convert the PhoNet frame structure to other structures, and vice versa, as required.

Figure 7:
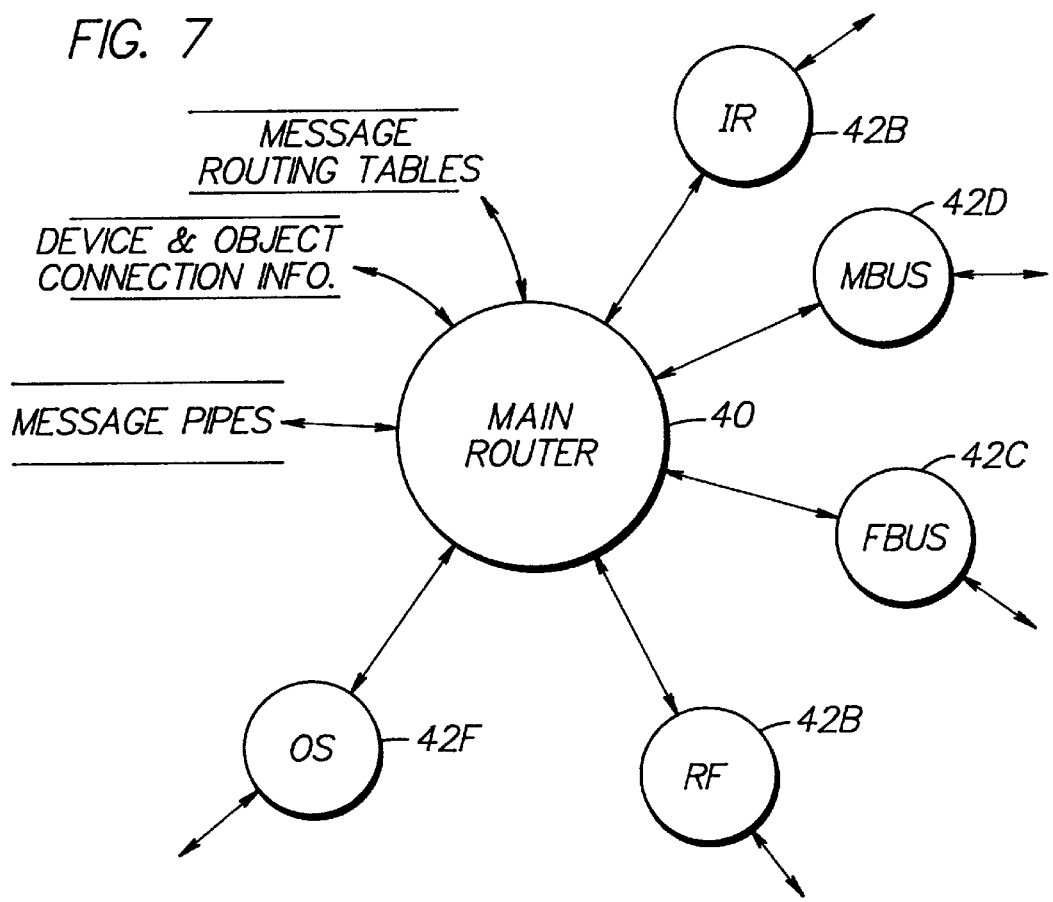
FIG. 7 depicts an example of the interconnectivity of the PhoNet main router and one or media driving message links, wherein OS message services are regarded as one media.

FIG. 7 depicts an example of the interconnectivity of the PhoNet main router 40 and a plurality of media driving message links, wherein OS 42F message services are regarded as one media.

Figure 8:
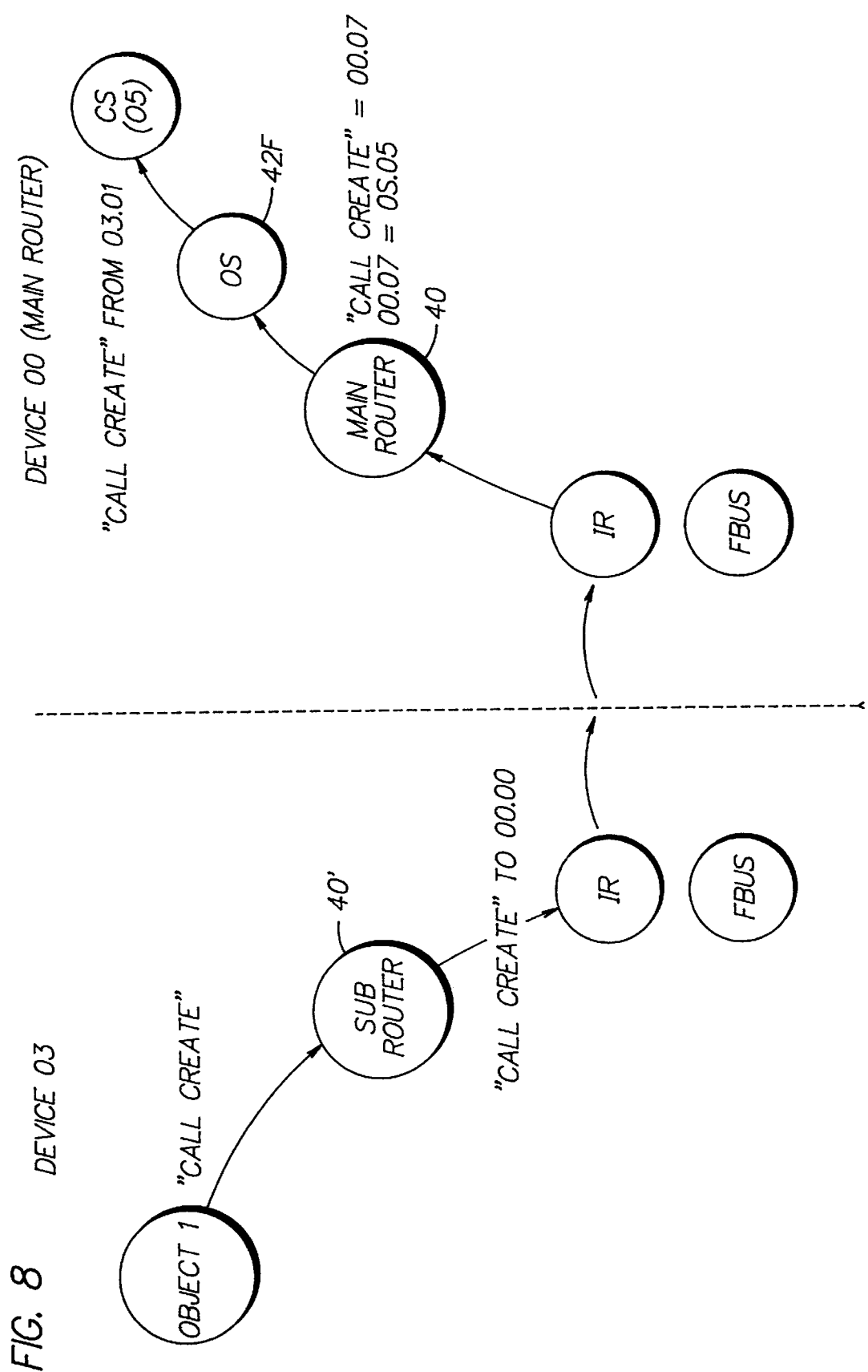
FIG. 8 depicts an example of message flow between a device and the main router for a "call create" message.

FIG. 8 depicts an example of message flow between a device and the main router for a "call create" message. In this case the call create message is passed through a sub-router 40' in the slave device 03, via the IR link to the main router 40 (device 00), which routes the call create through the OS 42F to the CS. In this example there are two physical media available for logical address 00.00, and the IR is preferred over the FBUS.

Figure 9:
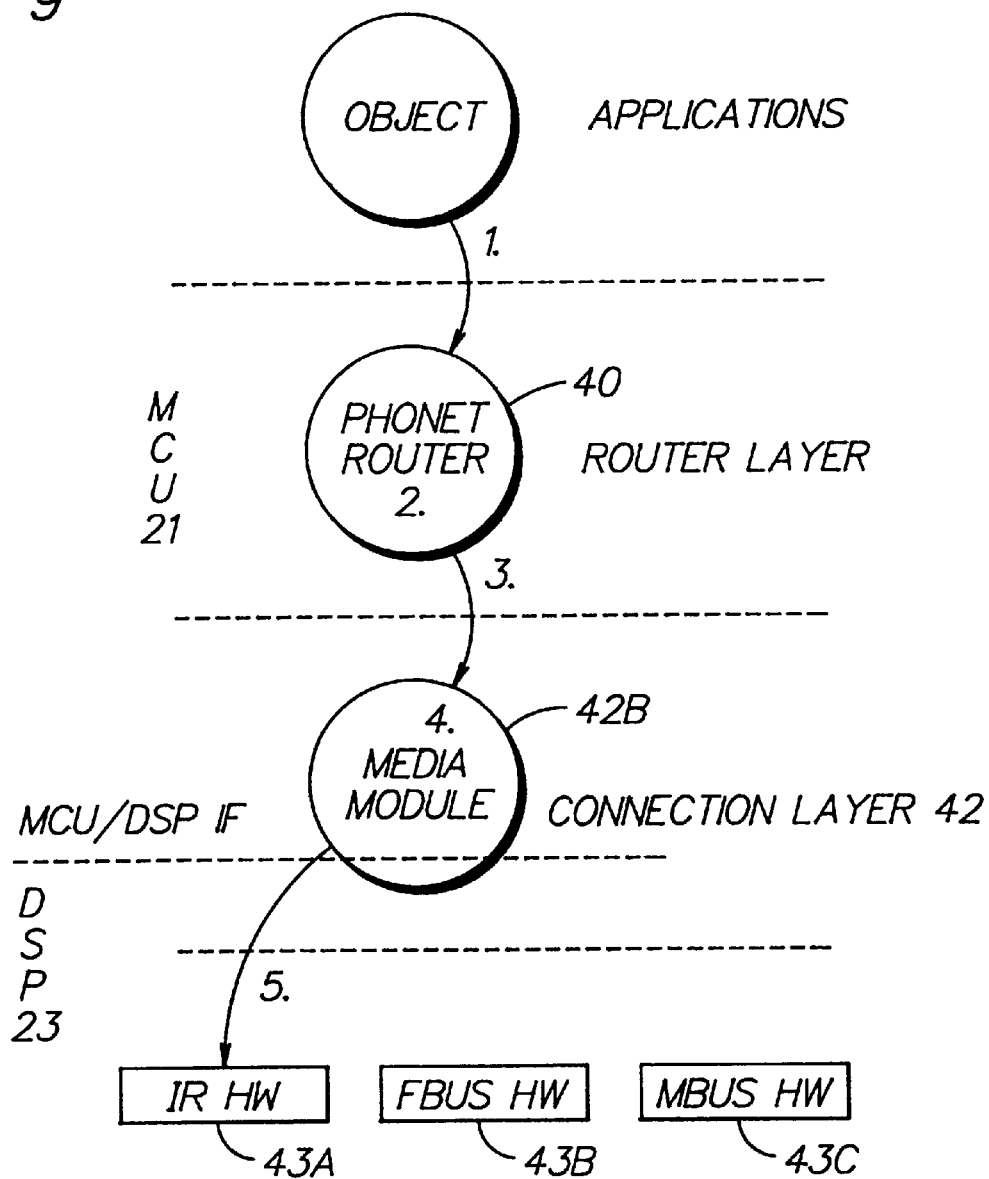
FIG. 9 depicts an example of message flow from an object (application) through the router layer and connection layer, across the MCU/DSP interface (IF), and to a requested physical media (e.g., IR hardware (HW))

FIG. 9 depicts an example of message flow from an object (application) through the router layer 40 and connection layer 42, across the MCU/DSP interface (IF), and to a requested physical media (e.g., IR hardware 43A). More particularly, the following steps take place.

1. An object, such as ISI, sends a message to be routed.
2. The PhoNet router 40 defines—where: device+object—how: physical media
3. The router 40 sends the message to the physical media module (e.g., IR HW 43A) which performs the necessary protocol by:

buffering message numbering acknowledgements retransmissions sends failure reporting to the router 40 and all other lower level tasks
4. Media module functions can be partitioned between the MCU 21 and the DSP 23. In general, all needed control is performed by the MCU 21, the DSP 23 may add some additional information to the frame but the main function is to "drive" the physical media. Typically the MCU 21 is too slow to drive a fast bus. A given media module can "drive" one or several different physical media (e.g., the wireless media module 42B can drive both the IR and RF links through their respective hardware interfaces).
5. The message is transmitted using the requested physical media (IR).

Having provided an overview of this invention, a more detailed description will now be made of the invention.

The mobile station 10 has a number of fundamental capabilities. These include cellular (and possibly cordless) system related capabilities (e.g. ability to make, receive and manage calls), and non-system related capabilities (e.g. ability to store and retrieve phonebook entries). The mobile station 10 includes all these fundamental capabilities that are integrated together in a coherent way to provide the phone's features.

An Intelligent Software Architecture (ISA) divides the mobile station's fundamental capabilities into logical groups or resources. In the ISA the mobile station's resources are controlled by servers. Each resource has a server. The server provides an interface which allows any number of applications to use the resource. The objective of the server is to encapsulate the resource it controls in a server interface. The server and the server interface are designed and implemented without direct regard to the applications that will use it.

Applications link together the resources of the mobile station 10 with logic to produce the mobile station's features. Applications can use any number of resources, via the servers, to build their features. Applications make 'resource requests' through the connectivity layer 41 (see FIG. 3), which may be considered for this purpose to include the functionality of the router 40 and the connection layer 42. The connectivity layer 41 delivers the 'resource request' message, using the router 40, to the appropriate server which controls the resource required. Servers perform the requested action and then send appropriate response messages back to the requesting application via the connectivity layer 41. The connectivity layer 41 provides an indirect message passing mechanism that allows applications to use the mobile phone terminal's resources without knowing how or where the resource, or the server that controls the resource, is implemented. The application needs only to know the properties of the resource and the interface to be able to use it. The connectivity layer 41 allows dynamic configuration of resources. This means that the resources and capability of the mobile station 10 can be changed dynamically. Applications can be made aware of such changes if required.

The connectivity layer 41 includes the protocol software of PhoNet and a communication manager which may be embodied in the control module 42A. The connectivity layer 41 handles Intelligent Service Interface (ISI) messages, which follow the PhoNet message format. The messages and the PhoNet are not tied to a certain bus hardware. The communication manager is responsible for distributing events to internal applications, servers and panels and maintaining communication between applications. The application manager takes care of the registration of the applications. Panels are used to display the information created by applications to the user in a desired user interface style. One significant difference over previous mobile station software architectures is the division of the user interface software into applications and servers. The servers can be called from outside the mobile station 10 using the connectivity layer 41 and the ISI interface. Applications using the same server(s) can exist either in the radio module or outside the mobile station 10 using the connectivity layer 41 and the ISI interface. Applications using the same server(s) can exist either in the radio module or outside it, e.g., in a PC or in an accessory device. In one previous software architecture the MCU SW was divided into subsystems, each being an autonomous part of the MCU software with a specified service to other subsystems. In the ISA the previous subsystems still mostly exist, but the servers have been introduced between the applications (UI) and the subsystems.

The objectives of the ISA include the following: to separate control of basic resources from control and logic of features; to separate entities requiring and providing services (applications & servers); to create an interface that allows servers to provide services to applications(s); to create an interface that allows a server to be changed without affecting the application (decoupling); to create an interface ensuring that servers need not know anything about the application using the services, i.e. allow new applications to be introduced without affecting servers; and to hide the location of applications and servers, even amongst several processors (distribution).

Several views of the architecture are described and illustrated in the ensuing discussion. The development view (FIG. 10) concentrates on the structure of the software, its partitions and layers. The physical view (FIG. 11) shows the system configuration. The task view (FIG. 12) describes the OS task allocation of entities. Message sequence charts are then provided made to describe the communication between applications, the connectivity layer 41, and the servers.

Figure 10:
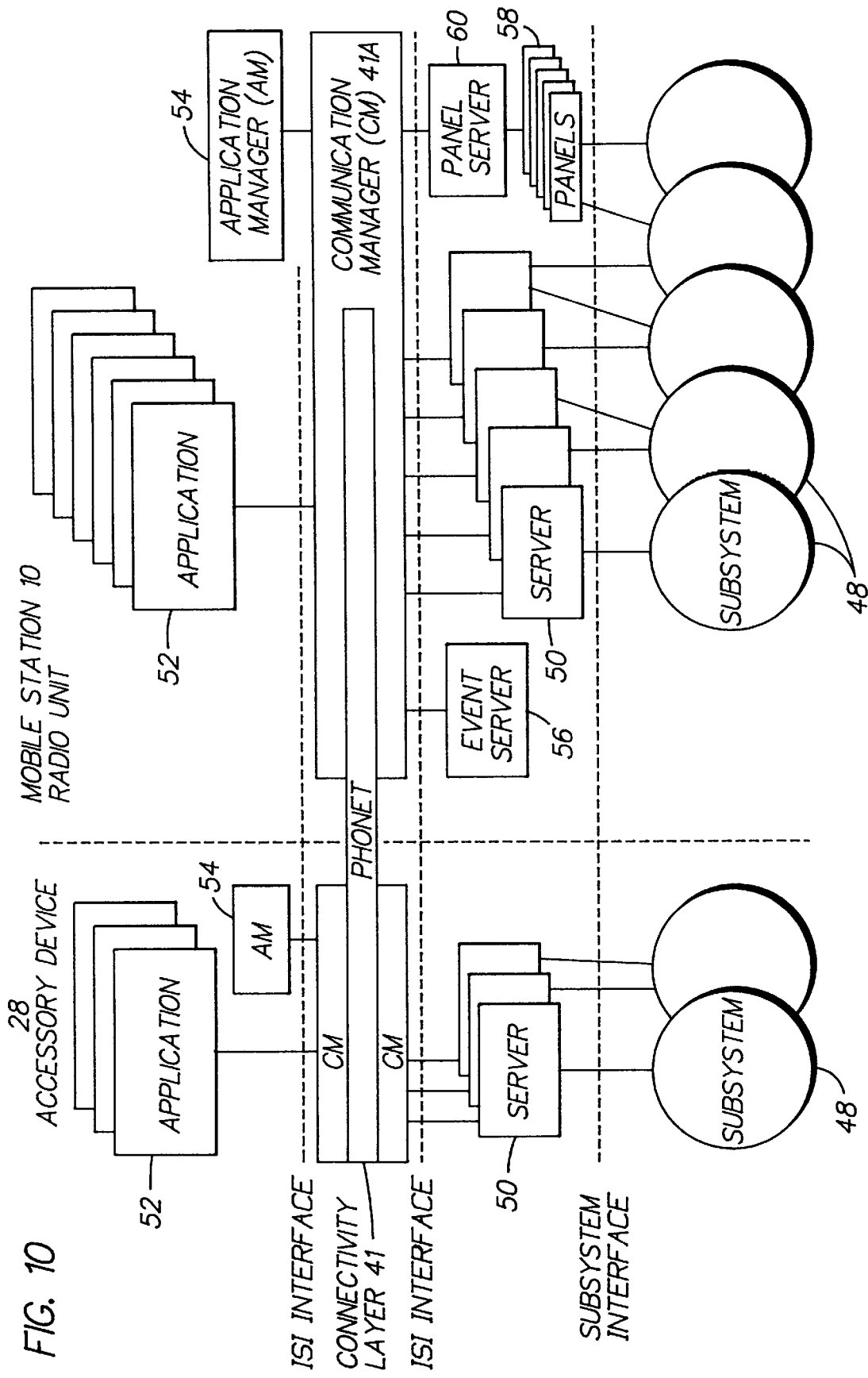
FIG. 10 is a high level diagram that depicts a software architecture of the PhoNet system with an accessory device coupled to a radio unit.

Referring to FIG. 10, the development view describes the structure of the software, wherein it can be seen that the mobile station's resources or subsystems 48, as well as those of an accessory device 28, are controlled by servers 50, which provide an ISI interface and which allow applications 52 to use the mobile station's subsystems 48. The applications 52 make resource requests to the connectivity layer 41 using ISI messages. The connectivity layer 41 includes the PhoNet and the communication manager 41A, as described above. Application managers 54, which may be instead a part of the communication manager 41A, are responsible for handling the registration of the applications 52. An event server 56, which also may instead form a part of the communication manager 41A, handles the event distribution from servers 50 to applications 52. Panels 58 provide the I0 functionality for the applications 52, and have an associated panel server 60. The various subsystems 48 in the same processor can also communicate directly with each other.

Figure 11:
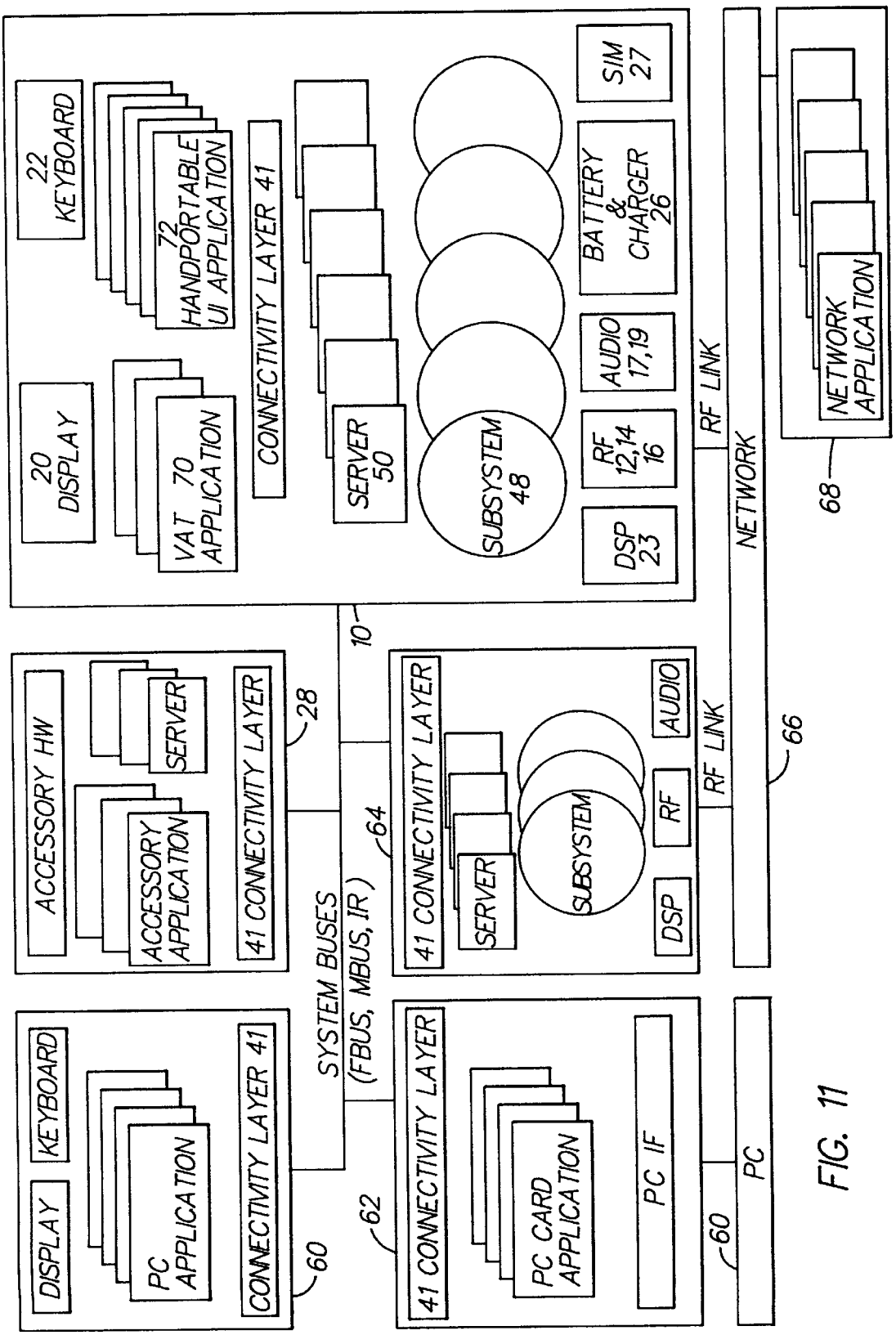
FIG. 11 is a high level diagram that depicts a physical architecture of the PhoNet system with a radio unit and a plurality of different external devices, such as a personal computer, external radio unit, and cellular network applications.

The physical view of FIG. 11 illustrates the use of the system buses (FBUS, MBUS, IR) to connect the mobile station 10 (also referred to as a radio unit) to, by example, the accessory device 28, a personal computer (PC) 60, a PC card, such as a PCMCIA card 62 connected to a second PC 60, an external radio unit 64, such as an AMPS pack for a DCS phone), a cellular network 66 and, through the cellular network 66 to a network application, such as over the air (OTA) features such as phone number inquiry, internet link, etc. The mobile station 10 in this example includes Value Added Service (VAS) applications 70 and handportable user interface applications 72.

Figure 12:
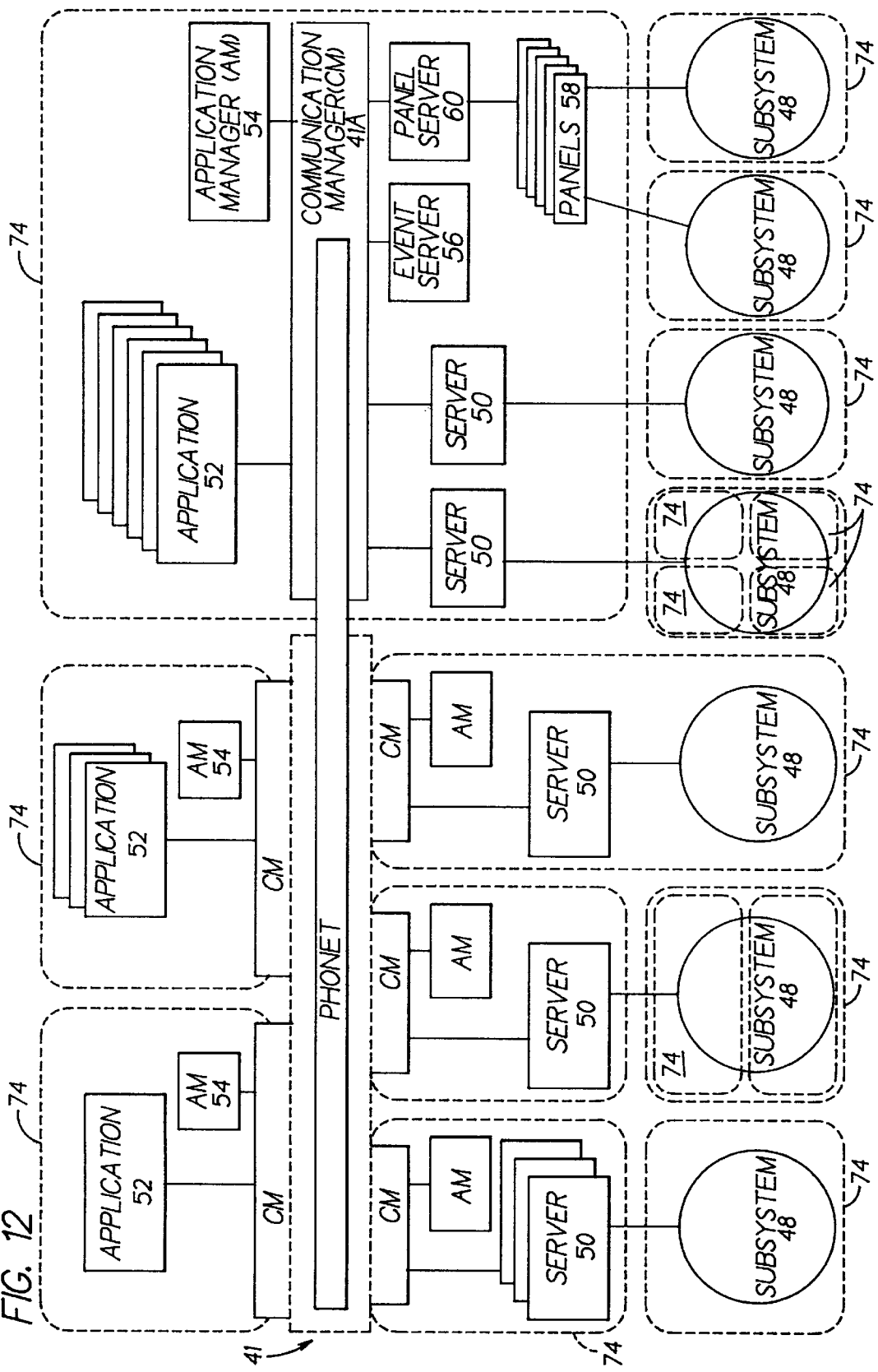
FIG. 12 is a high level diagram that depicts a task view of the PhoNet system.

The Task view of FIG. 12 (which is similar to the Development view of FIG. 10) shows the OS task 74 allocation of the MCU 21 software. Each OS task 74 is depicted as a dashed rectangle. The user interface task includes applications 52, servers 50, application manager 54 (the functionality of which may be incorporated into the communication manger 41A) and panels 58. Other applications can exist in other MCU 21 OS tasks. The servers 50 can be located in the same task as subsystems or separated, while most complicated subsystems (e.g. CS) include several OS tasks. PhoNet has its own OS task. Each task containing either an application or a server has its own communication manager 41A.

Having described the overall architecture, a description will now be made of entities. An entity is intended to mean either an application 52, a server 50, the connectivity layer 41, or a subsystem 48. The ISA partitions software into applications 52 and servers 50. It is necessary to be able to identify the difference between a server 50 and an application 52 to ensure the correct partitioning of the architecture. This information is useful for understanding what a particular entity does and for partitioning the system when a new functionality is added.

The properties of a server 50 include the following: a server controls a resource; a server 50 provides an interface which allows other entities access to the resource it controls (the interface is assumed to conform to an ISI specification); a server 50 can only be accessed by resource requests made via the connectivity layer 41 using a valid resource address; only a server 50 can serve resource requests; a given server 50 can use the services provided by one or more of the other servers 50 to build its own services; and a server 50 does not present information to the user via the panels 58.

The properties of an application 52 are as follows: an application 52 does not control a resource; an application 52 does not provide services via an ISI interface; an application 52 cannot be accessed by resource requests made via the connectivity layer 41; an application 52 uses the services of one or more of the servers 50 to build features; an application 52 can present features to the user via the panels 58, but is not required to perform this function.

With regard to the roles played by entities in transactions, it is possible that a server 50 uses its own resources as well as the services offered by other servers 50 to build its own services. For example, consider a memory search feature in a GSM mobile station. In this example there is an application 52 in the handportable user interface which uses the services offered by the panel server 60 and a phone book server 50 to build a memory search feature. The application 52 may request the phonebook server 50 to match a name to an entry in the phonebook. The phonebook processes the request and responds with the closest matching entry, or with an error indication, to the requesting application 52.

In processing the application's request the server 50 may be required to use its own resources, e.g. the phone's own phonebook memory, and the resources of another server, for example the SIM server 50, if the phonebook entry is held in the SIM 27. In this case when processing the applications' request the phonebook server 50 will, itself, have to make a resource request to the SIM server 50 to access the phonebook entries stored in the SIM 27. The application 52, that made the original resource request, does not know, and does not need to know, that the server 50 that processed its resource request had to make its own resource request to complete the request.

In this type of situation it is useful to identify the role that a given entity takes in a certain transaction.

A transaction is comprised of a sequence of communications, i.e., messages that are passed between two entities. In each transaction one entity takes the client role and the other takes the server role. The client role is taken by the entity that makes resource requests, receives responses, indications or consult requests, or sends inform response messages. Entities classed as applications 52 or servers 50 can take the client role in a transaction. The server 50 role is taken by the entity that serves resource requests, makes consult requests, sends indication messages or receives inform response messages. The server 50 role can only be taken by entities classified as servers 50. An application 52 can never take the server 50 role. It is possible that an entity takes the server 50 role in one transaction, e.g, serves a resource request, and then takes the application 52 role in the next transaction, i.e., makes a resource request.

An application 52 implements a feature to the software with the help of one or more servers 50. Applications 52 inside and outside of the mobile station 10 use the same server 50 interface. In general, applications 52 use the resources offered by servers 50. The servers 50 are available through the connectivity layer 41, i.e., the communication manager 41A and the PhoNet. Applications 52 receive events from other applications 52 or external devices. Applications 52 can create panels 58 to perform input and output operations with the user.

The application manager (AM) 54, the functionality of which in the presently preferred embodiment of this invention is incorporated into the communication manager 41A, is responsible for managing applications 52 and servers 50 within a task. There may be several instances of the application manager 54, each one running in a separate OS task. The responsibilities of the application manager(s) 54 include: registering new applications 52/servers 50; removing applications 52/servers on request; managing event subscriptions from applications 52/servers 50 within a task; passing events to subscribing applications 52/servers 50; and starting the initial application(s) 52/server(s) 50 associated with a particular instance of the application manager 54.

A list of applications 52/servers 50 maintained in the application manager 54 is also used by the communication manager 41A for the particular tasks. Even if a given task only contains one application 52 or server 50, an instance of the application manager 54 is still provided.

The above-referenced VAS applications 70 can be divided into fixed applications, dynamic applications and downloadable application. A fixed application is a permanent application receiving some information from outside the mobile station 10, e.g., a new ringing tone is programmed into the mobile station 10 by a message received from the network 66 (see FIG. 11). A dynamic application has more interaction with the network 66, e.g., an internet browser. Downloadable applications are comprised of a script language or object code which is programmed over the air interface to the mobile station 10 from the network 66.

External applications (outside the MCU 21) are similar to handportable UI applications, but run instead in another processor. They communicate by ISI messages with panels 58 and servers 50 in the mobile station 10. Examples include personal communicator type applications and voice recorder applications.

Network applications use the mobile station's resources over the air. Their use of mobile station's resources is controlled, for example, by the VAS applications 70 in the mobile station 10.

Various server 50 categories exist. In general, a server 50 offers a set of services to (any) application 52. A server 50 can be inside or outside of the mobile station 10. The servers 50 can be divided into several categories, as follows.

Default server: A server 50 is a default server for a certain resource when the connectivity layer 41 is configured so that all resource requests for that resource are delivered to that particular server.

Multiple server: The mobile station 10 may contain two or more similar resources, i.e, resources of the same type. In this case each resource has its own server 50, which implies that there will be more than one server 50 for a particular resource type in the mobile station 10 and its accessories.

For example, there may be multiple phonebooks. In a personal communicator embodiment of the mobile station 10 there may be phonebooks in both the personal communicator unit and in the radio unit. Both of these phonebooks have their own servers.

Further by example, in a multi-mode mobile station there may be two kinds of call resources, one for each of the cellular/cordless systems supported (e.g., AMPS and IS-136). These two call resources each have their own servers 50.

Dynamic Server: A dynamic server is any server that is added to the system after compile/build time. A dynamic server can exist inside the mobile station 10 (e.g., downloadable software), or on other devices connected to the mobile station 10.

Director: In the case where there are multiple servers 50 in the mobile station 10 and its accessories then one entity is assigned a higher level of control to arbitrate between the multiple servers 50, e.g. defining which of the multiple servers is the default server. This entity is referred to herein as a director. The director may be one of the multiple servers 50, or it may be an independent entity.

The event server 56, the functionality of which in the presently preferred embodiment of the invention is incorporated into the communication manager 41A, handles the event distribution from servers 50 to applications 52. The event server 56 has the following functionality.

Applications 52 use the event server 56 function for subscribing to events of a particular resource (e.g., timing interrupts from a time keeping resource). The event server 56 also stores information about which applications 52 are registered for which events. The event server 56 receives all events from the servers 50, and distributes the events to all applications 52 who are registered to receive those events.

An application 52 uses a set of panels 58 to provide its I/O functionality. The purpose of the panel server 60 is to extract the style specific information from the applications 52 to increase their portability. The interface between applications 52 and panels 58 is message based due to the fact that applications 52 may be external to the mobile station 10.

The panel server 60 is thus used to handle the communication between an application 52 and panels 58. It provides methods for the creation and deletion of panels 58. The panel server 60 stores a stack containing information describing current panels 58 and the relative priority of each panel. An external application 52 can use the mobile station's keyboard 22 and display 20 by reserving panel(s) 58 from the panel server 60. External applications 52 can create customized panels or predefined panels 58.

Turning now to a special server of most interest, a System Mode Control (SMC) server is a special server that handles multi-mode mobile station control. The general purpose of multi-mode mobile stations is twofold: to combine different cellular (or cordless) systems into one, which gives optimal performance concerning coverage and capacity (the mobile station 10 has only one telephone number but supports different systems); and to combine two different and independent systems into one, which offers the user two systems in one terminal. In this latter case the mobile station 10 has a telephone number for each system.

The SMC server's role in ISA is to control the selection of cellular (or cordless) system software which may be implemented externally (outside MCU 21, e.g. AMPS in a battery pack for DCS, as shown in FIG. 11, unit 66) and internally (inside the MCU 21, e.g. DECT+GSM or PDS+PHS). The SMC server need not be included in single mode mobile stations (e.g., AMPS or GSM only).

The SMC server functions to separate the multi-mode functionality from the specific servers 50. System specific servers 50 include, by example, a Call server, Short Message Service (SMS) server, a Supplementary Service (SS) server, and a Network Selection (NS) server 50. The separation is preferably done by a flexible configuration of the connectivity layer 41, and by adding a special routing mechanism to the connectivity layer 41, which is recognized and acted on by the router 40.

The different systems are implemented in separate system servers 50 which offer the same architecture for both external and internal systems. In addition, they offer a complete separation of the different systems, which also enhances the modularity of the system configuration.

Figure 22A:
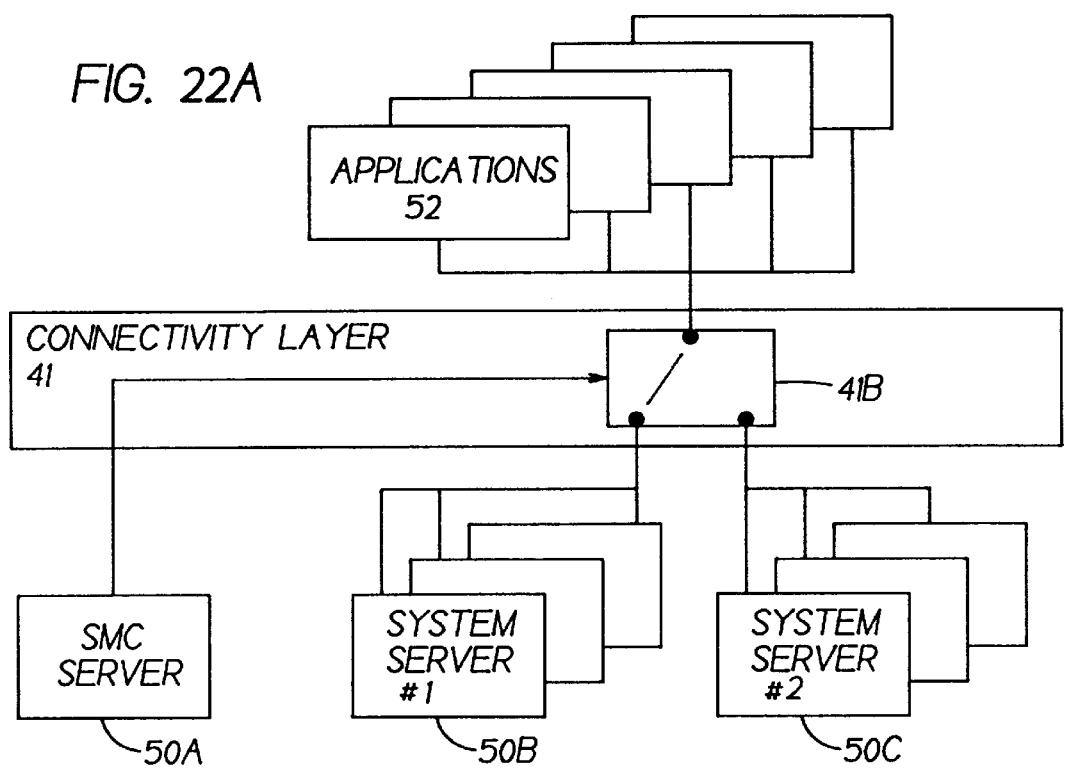
FIGS. 22A and 22B illustrate two embodiments of a System Mode Control (SMC) server, which incorporates system selection rules, and its connection to applications and system servers.
Figure 22B:
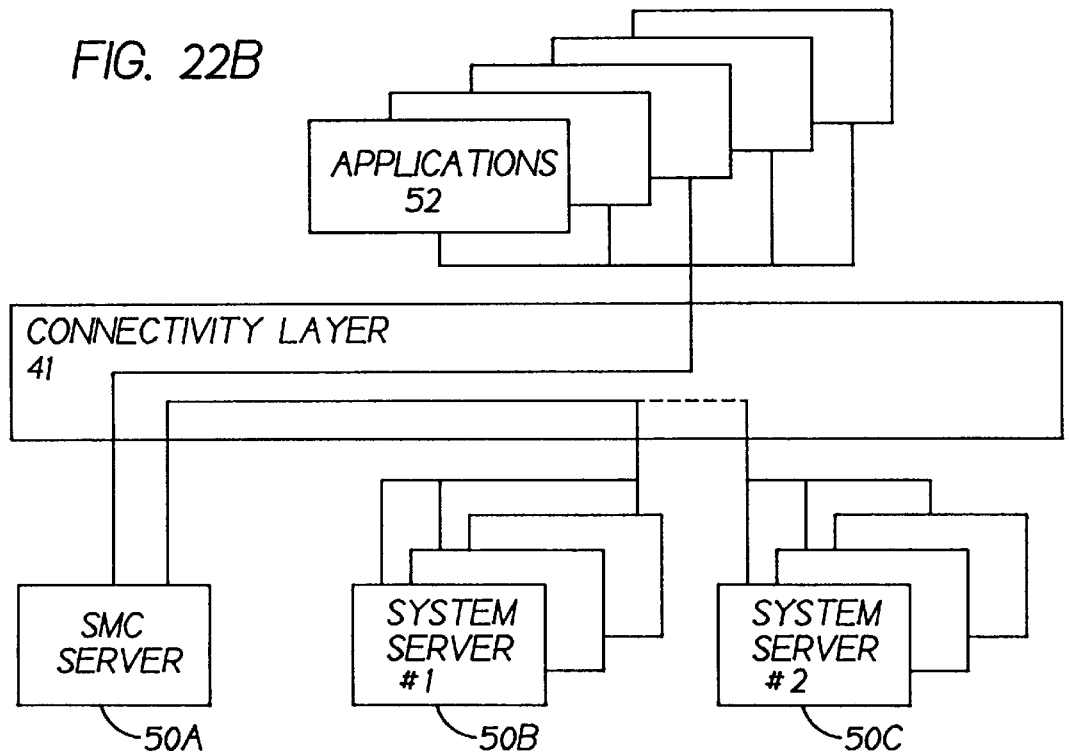

FIGS. 22A and 22B illustrate two embodiments of the System Mode Control (SMC) server 50A, which incorporates system selection rules, and its connection to applications 52 and system servers 50, specifically first system servers 50B and second system servers 50C. In the embodiment of FIG. 22A the SMC server 50A operates through the connectivity layer 41 so as to control the connection of the applications 52 to one or the other of the system servers 50B and 50C. The operation of the SMC server 50A is schematically illustrated as a single pole, double throw (SPDT) switch 41B. The embodiment of FIG. 22B, which is presently preferred, couples the application 52 to the SMC server 50A through the connectivity layer 41, and then the SMC server 50A, also through the connectivity layer 41, to a selected one of the system servers 50B and 50C.

In the embodiment of FIG. 22A the applications 52 send generic messages to the system servers 50B or 50C. The SMC server 50A controls the switch 41A in the connectivity layer 41, affecting indirectly to the routing of messages.

Besides controlling the routing, the SMC server 50A performs several other functions. These include the control of which system should be active (suspend and resume of systems); initializing all functions that are required when turning one of the systems off (e.g., call forwarding, automatic dialling to an operator center); controlling scanning procedures on the inactive system (e.g., each 5 min.); controlling the selection of different systems (depending on a priority of systems); controlling the connectivity layer 41 switch in the embodiment of FIG. 22A (control of routing); handling of user controlled actions (e.g., a forced set-up of a call to the inactive system, user initiated-scanning); and interacting with the applications 52, connectivity layer 41, and the system specific servers 50B and 50C to fulfill the multi-mode requirements.

In general, the applications 52 build their features by using the resources of the mobile station 10 via the ISI server interface. Applications 52 make resource requests to the connectivity layer 41. The connectivity layer 41 maps each resource request to the server 50 that is currently configured to be active for that resource, typically the default server. All such server configuration tables are stored and maintained in the connectivity layer 41 by the MCU 21. A default configuration of the resource to server mapping is defined at compile time, but the mapping can be modified in run time. Applications 52 that attempt to use system resources that are not supported receive a 'not supported' indication in a response message.

To summarize, and as was described previously, the connectivity layer 41 is responsible for the detection, registration and addressing of the connected servers 50 and applications 52. It handles message routing from resource names to resource logical addresses, and from logical to physical addresses. The sender is not required to know if a message is going to an entity in the same processor or to an entity in an accessory device, behind some physical bus. The connectivity layer 41 masks the actual physical location behind the ISI interface.

Applications 52 and servers 50 use the communication manager 41A for communicating. The communication manager 41A checks to determine if the target for the communication is located in the same OS task. If it is then the communication is routed to that target. If the target is not in the same OS task, the communication manager 41A passes the request to the PhoNet as an ISI message. The PhoNet then delivers the message to the mailbox of the appropriate OS task, or if the target is located on another device it passes the message to the device via a suitable media such as a serial IR bus 18C. A response message is routed in the same way, either directly to the sender by the communication manager 41A or by the PhoNet to the communication manager of the sender's OS task. There is one instance of the communication manager 41A for each OS task that contains either application 52 or servers 50.

Communication between entities (applications 52 and servers 50) is message based. The messages are either OS messages from task to task or messages sent through some physical bus (e.g. FBUS, IR link). The messages are ISI requests, responses and indications.

The communication between applications 52 and servers 50 is divided into the following groups.

A Resource Request is generated by an application 52 requesting to use one of the resources of the mobile station 10. The Resource Request is passed from the application 52 to a server 50 by the connectivity layer 41.

A Response is sent by a server 50 to send the result of an operation, initiated by a Resource Request, back to the requesting application 52.

An Indication, also referred to herein as a notification or an event, is sent by a server 50 to pass Status Information concerning the resource the server 50 controls to one or more applications 52.

The Status Information can sent by the server 50 to report an event to an application or applications 52, wherein the event occurred in the resource that the server 50 controls. In this case the event was not directly caused by a Resource Request from an application 52. One example of such an event is an incoming call received by the Call server.

The Status Information can be sent by the server 50 to report the ongoing status of an operation to an application or applications 52. This particular Status Information is not the result of the operation, which is instead given in a Response message.

The Status Information may also be sent in response to an operation caused by a Resource Request made from an application 52 to the server 50. The operation takes place in the resource that the server 50 controls.

The communication between applications 52 and servers 50 also includes the following.

A Consult Request is sent by a server 50 that is performing an action initiated by a Resource Request made by an application 52. To continue processing the server 50 requires some information from the application 52 that initiated the request. The information required could be, by example, that the server 50 may need to inform an application 52 of an event and also 'handshake' with the application 52 (e.g., to request whether the server should continue processing). The Consult Request may also be sent by the server 50 to obtain more information from the application 52 to allow processing to continue.

Finally, an Inform Response is sent by application 52 to respond to a Consult Request received from a server 50. The Inform Response could contain the additional information required by the server 50.

The following suffixes are appended to all message identifiers to indicate the nature of the message.

| | |
|---|---|
| _REQ | Resource Request |
| _RESP | Response to a Resource Request |
| _IND | Indication |
| _CONS | Consult Request |
| _INF | Inform Response |

Figure 13:
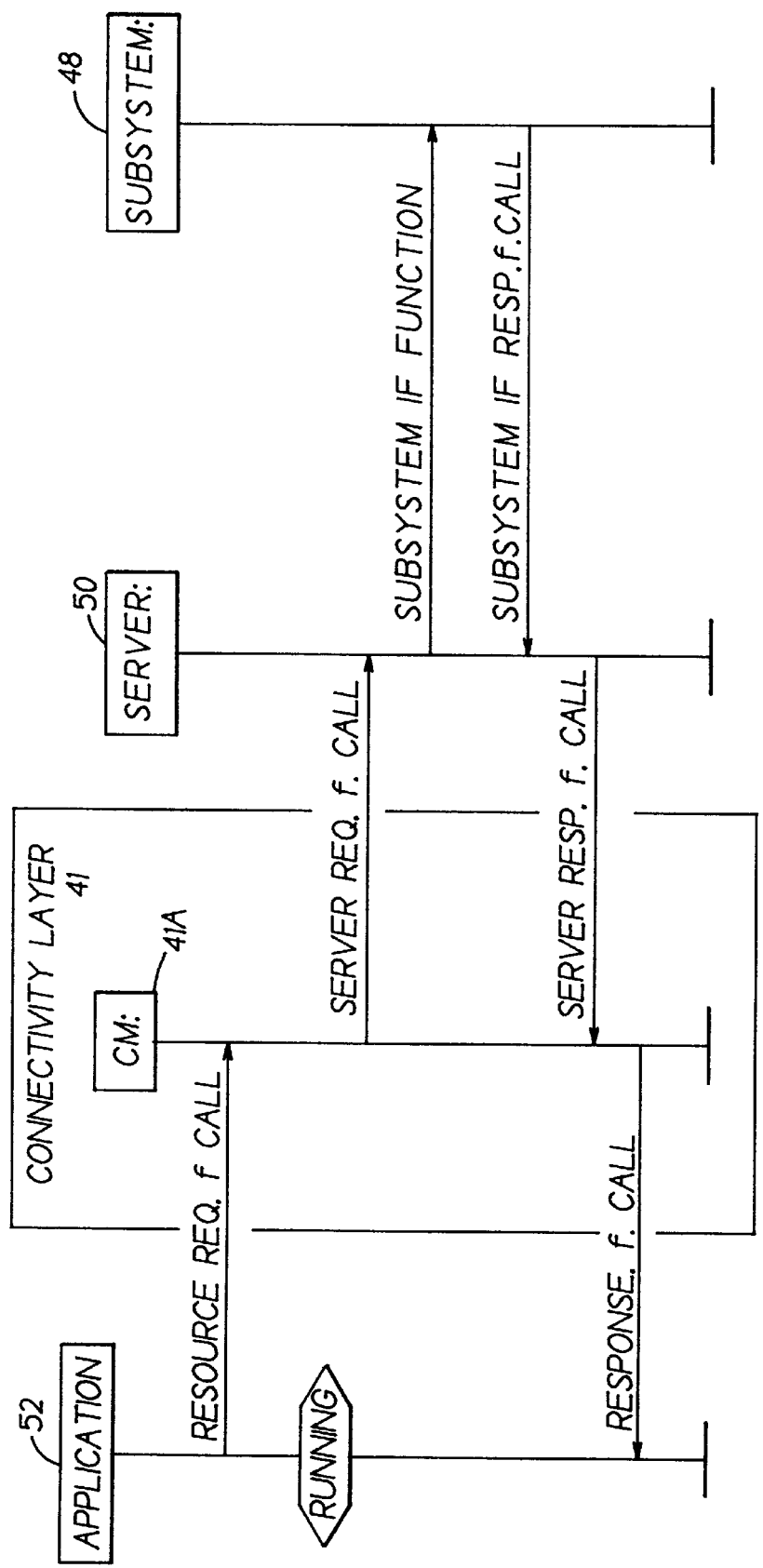
FIG. 13 is an exemplary message sequence chart for a case where an application and a server are in the same task.
Figure 14:
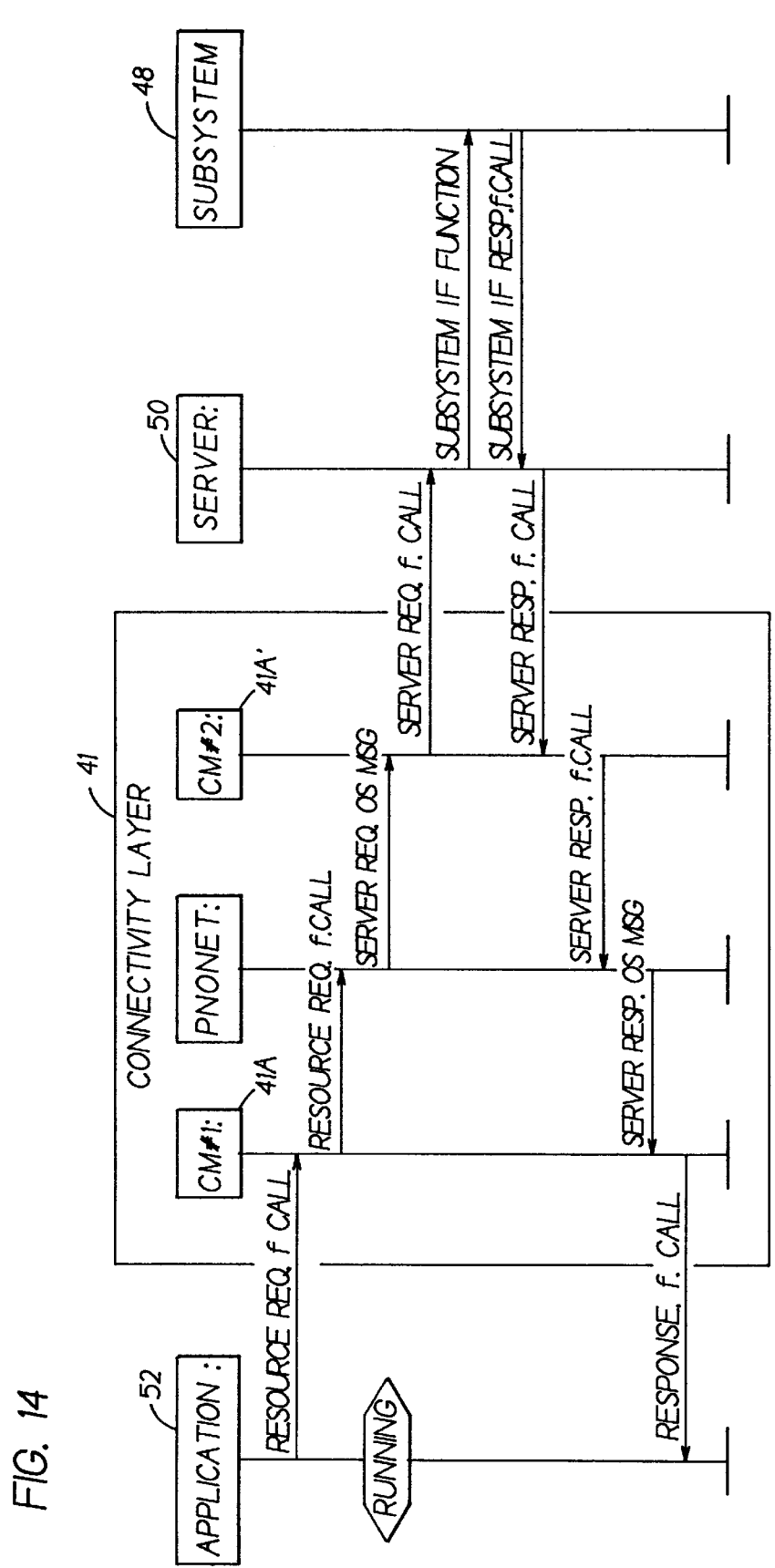
FIG. 14 is an exemplary message sequence chart for a case where an application and a server are in the same processor, but in different tasks.
Figure 15:
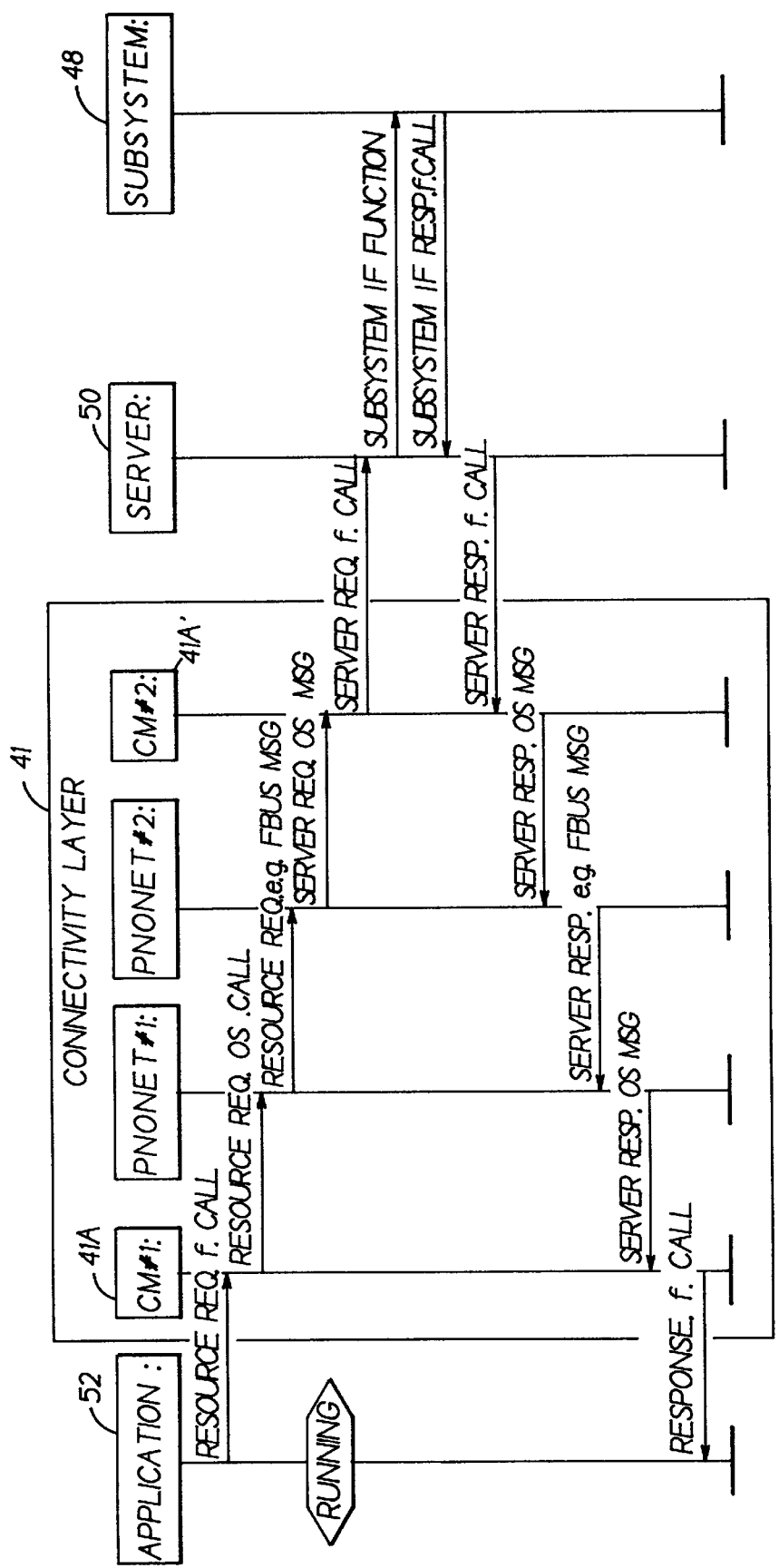
FIG. 15 is an exemplary message sequence chart for a case where an application and a server are in different processors.

The communication between applications 52, the connectivity layer 41 (communication manager 41A and PhoNet), servers 50 and various subsystems is described in the message sequence charts illustrated in FIGS. 13, 14 and 15. In these diagrams an application 52 and a server 50 are either inside or outside the MCU 21. In each diagram the same protocol is described, i.e., an application 52 sends a Resource Request and the server 50 which supports the resource receives the Resource Request and sends a Response back to the requesting application 52.

Some abbreviations that are used in the diagrams include: f. call=function call, if=interface, msg=message, r.value= return value (of a function), req=request, resp=response, CM=communication manager.

Referring first to FIG. 13, where the application 52 and server 50 are in the same OS task, the CM 41A receives a Resource Request from application 52 in the form of an ISI message. The CM 41A determines that the server 50 to serve this Resource Request is located in the same OS task. The Cm 41A delivers the Resource Request to the server 50. If needed, the server 50 interprets and converts the Resource Request into subsystem 48 interface function call(s). The subsystem's response is either an OS message or a return value of the interface function. The server 50 has now the needed data to form a Response message. The server 50 passes the Response to the Resource Request back to the CM 41A, which in turn passes the Response back to the requesting application 52.

Reference is now made to FIG. 14, wherein the application 52 and the server 50 are located in the same processor (MCU 21), but in different OS tasks, a first CM 41A (CM#1) receives a Resource Request from application 52 in the form of an ISI message. CM#1 determines that the server 50 to serve this Resource Request is not located in the same OS task. CM#1 passes the Resource Request to PhoNet, which delivers the message to the OS mailbox of the task configured to contain the server 50 for that resource. A second CM 41A' (CM#2) of that task reads the OS mailbox and delivers the message to the server 50. If needed, the server 50 interprets and converts the Resource Request to interface function call(s) for the target subsystem 48. The subsystem's response is either an OS message or a return value of the interface function. The server 50 now has the necessary data to form a Response message. The Response message is addressed to the OS task, which was contained in the header of the originally sent Resource Request message (see Table 6 above). The server 50 passes the Response to the Resource Request back to CM#2, which delivers the Response message to Phonet, which forwards the Response to CM#1. CM#1, located in the task of the application 52, receives the message and passes the Response back to the requesting application 52.

Reference is now made to FIG. 15, wherein the application 52 and the server 50 are located in different processors. First, the CM#1 receives a Resource Request from application 52 in the form of an ISI message. CM#1 determines that the server 50 to serve this Resource Request is not located in the same OS task. CM#1 passes the Resource Request to PhoNet#1. PhoNet#1 delivers the device to Resource Request message to the device configured to contain the resource. PhoNet#1 delivers the Resource Request message over a suitable link, such as the IR link 18C, as determined from, by example, a preferred link that was specified by the device when it registered with PhoNet#1, as described above. Phonet #2 in the device receives the Resource Request message from the selected link and delivers the message to the OS mailbox of the task configured to contain the server 50 for that resource. CM#2 of that task reads the mailbox and delivers the message to the server 50. If needed, server 50 interprets and converts the Resource Request to subsystem interface function call(s). The subsystem's response is either an OS message or a return value of the interface function. Server 50 has now the required data to form a Response message, which is addressed to the device and the object which were contained in the header of the Resource Request message. Server 50 passes the Response message back to CM#2, which delivers the Response message to PhoNet#2, which in turn delivers the Response message to PhoNet #1 in the original device. PhoNet#1 receives the Response message and routes the Response message to the target task as an OS message. CM#1 receives the OS message and passes the Response message back to the requesting application 52.

A more detailed description is now made of the Intelligent Service Interface (ISI) in accordance with an aspect of this invention.

An ISI server 50 'owns' the interface between the server 50 and a client (a client is an application 52 or another server 50 using the ISI server). As such, messages sent to and from the ISI server are always expressed in the desired format of the ISI server, and not in the format of the requesting client. This ensures that the ISI server interface is defined independently of the clients that use it, and the services of the ISI server can therefore be used by any client.

The ISI message suffixes allow messages to be defined in a way that shows the context in which they are used. Information that can be gained from understanding the suffixes include: who was the sender of the message, the client or the ISI server; who is the intended receiver of the message, the client or the ISI server; and in what context was the message sent. That is, was the message the result of a previous message, or did the message initiate a new request.

The messages that are used in communication between an ISI server and its clients were defined above to include the Resource Request, Response, Indication, Consult Request, and Inform Response messages.

Every ISI message contains a message header. The message header follows the PhoNet message header. The first portion of the data part of the message are common between all ISI messages.

The basic ISI message format is shown in the following table. An H or D in the first column denotes if the field is in the Header or Data part of the message.

ISI message format

| | Field Description | Notes |
|---|---|---|
| H | media | Defines the media to be used. e.g. PN_MEDIA_MBUS, PN_MEDIA_FBUS |
| H | receiver device | Device address of the receiver. 1st part of sender's address |
| H | sender device | Device address of the sender. 1st part of sender's address |
| H | Resource | ISI Resource group, as defined in the ISI specification. This is known as 'function' in PhoNet terms. |
| H | length | Number of subsequent bytes in the message, starting with and including the receiver object. This field always follows a processors LSB/MSB conventions for handling word data. The media drivers in PhoNet handle the conversion to and from the PhoNet fixed MSB, LSB order during interprocessor communication. |
| H | Receiver object | Internal address of the receiver object. 2nd part of receiver's address. |
| H | Sender object | Internal address of the sender object. 2nd part of sender's address. |
| D | Unique Transaction ID | Used to identifier which transaction a message belongs to. |
| D | Message ID | ISI message ID. |

-continued

| ISI message format | | |
|---|---|---|
| | Field Description | Notes |
| D | Msg data 1 | Message data as indicated in the ISIS specification for this message. |
| D | Msg data 2 | Message data . . . |
| D | Msg data n | Message data . . . |

The ISI message specification need not include the complete ISI message description for each message, as many of the fields in the message header are handled in the same way for all messages. The ISI message specifications use the following format to describe ISI messages.

| Message ID Description | Parameters |
|---|---|
| Message header info | As in the PhoNet message header described above |
| Resource | RESOURCE_ID |
| Message header int. | As in PhoNet message header described above |
| Unique Transaction ID | |
| Message ID | MESSAGE_ID |
| message data | |

The following ISI message fields are specified for each ISI message.

Resource—This field describes the resource (and therefore the server 50) that the message belongs to, e.g., ISI_PND (phone number directory), ISI_CALL, ISI_MENU etc. Unique Transaction ID (UTID)—This field is used to identify which transaction a message belongs to. Message ID—This field describes a particular message within a resource. Message data—These bytes are the content of the message, as described in the specific message specification.

As an example, and to build an ISI message for a Resource Request message, Resource Requests (message type _REQ) use the 'route by source' feature of the connectivity layer 41 to deliver resource requests from a requesting application 52 to an appropriate server 50 to serve the request. This implies that the requesting application 52 need not know the Device and Object address of the receiver when it builds the ISI Resource Request message.

The following table describes the specific information for building an ISI message used to make a Resource Request.

| | Field Description | Notes |
|---|---|---|
| H | media | PN_MEDIA_ROUTING_REQ |
| H | receiver device | PN_DEV_HOST |
| H | sender device | Device ID of the application 52 making the resource request |
| H | Resource | ISI Resource group, as defined for the required message |
| H | length | Length of the message, as the number of bytes to follow. |
| H | Receiver object | PN_OBJ_ROUTING_REQ |

-continued

| | Field Description | Notes |
|---|---|---|
| H | Sender object | Object ID of the appiication 52 making the resource reguest |
| D | Unique Transaction ID | Unique transaction ID generated by the requesting application 52. |
| D | Message ID | ISI message ID, as defined for the required message in the appropriate ISI specification. This has the suffix _REQ. |
| D | Msg data 1 | Message data, as defined for the required message in the appropriate ISI specification. |
| D | Msg data 2 | Message data . . . |
| D | Msg data n | Message data . . . |

Further by example, and to build an ISI message for all other types of messages, the message types _RESP, _IND, _CONS and _INF all use the 'route by receiver's address' feature of the connectivity layer 41. This implies that the entity (application 52 or server 50) sending the message must have prior knowledge of the address of the receiver. In general, the address of the receiver will be known by the sender due to communication earlier in the transaction or in previous transactions. Previous communication or previous transactions will have taken place due to the nature of these message types, as was described above in the examples depicted in FIGS. 13–15.

The following table provides information for building an IS message which is to be sent directly to a receiver.

| | Field Description | Notes |
|---|---|---|
| H | media | PN_MEDIA_ROUTING_REQ |
| H | receiver device | Device ID of the entity that will receive the message. The Device ID can be found from the 'sender device' field in the header of a message previously received from the entity. |
| H | sender device | Device ID of the application 52 making the resource request |
| H | Resource | ISI Resource group, as defined for the required message in the appropriate ISI specification. Although this message is not routed by function this field is still included because messages are identified by a combination of Resource and Message ID. The scope of a message ID is limited to a particular resource. |
| H | length | Length of the message as the number of bytes to follow. |
| H | Receiver object | Object ID of the entity td receive the message. The Object ID can be found from the 'sender device' field in the header of a message previously received from the entity. |

-continued

| | Field Description | Notes |
|---|---|---|
| H | Sender object | Object ID of the application 52 making the resource request. |
| D | Unique Transaction ID | Unique transaction ID. The UTID is either generated by the sending entity or is copied from a previous message earlier in the transaction or from a previbus transaction. |
| D | Message ID | ISI message ID, as defined for the required message in the appropriate ISI specification |
| D | Msg data 1 | Message data, as defined for the required message in the appropriate ISI specification. |
| D | Msg data 2 | Message data . . . |
| D | Msg data n | Message data . . . |

ISI is an asynchronous message passing system. Entities communicating using ISI messages may be distributed. Entities may be located within the same OS task, within separate OS tasks on the same processor or on separate processors. Entities may be sending and receiving messages with one or more entities at the same time. Applications 52 can use the services of many servers 50, and servers 50 can provide their services to many applications 52.

The asynchronous nature of the interface implies that entities are not certain when a response to a message they have sent will be received. Due to the possibility of having distributed entities the message transmission latency may differ message by message depending on the locations of the destinations and the media through which the messages are delivered. The relationship between applications 52 and servers 50 may mean that a given entity has many communications active with many entities at any one time.

Due to the characteristics described above mean, the ISI system provides support to enable applications 52 and servers 50 organize their communications so that the effects of asynchronous communication, distributed communication, and multiple simultaneous communications can be readily handled.

ISI uses transactions to organize the message passing. A transaction is a sequence of communications (i.e. messages) passed between two entities. In each transaction one entity takes the client role and the other takes the server role. The client role is taken by the entity that makes Resource Requests, receives Responses, Indications or Consult Requests or sends Inform Response messages. Entities classed as applications 52 or servers 50 can take the client role in a transaction. The server role is taken by the entity that serves Resource Requests, makes Consult Requests, sends Indication messages or receives Inform Response messages. The server role can only be taken by entities classed as servers 50. By definition, an application 52 can never take the server role.

It is possible that an entity takes the server role in one transaction, e.g. serves a Resource Request, and then takes the client role in the next transaction, i.e. makes a Resource Request.

The following types of transactions are encompassed by the teachings of this invention with respect to ISI messages:
Resource Request transaction;
Event Indication transaction;
Event Indication transaction with subsequent actions; and
Consult Request transaction.

The Resource Request transactions starts when an application 52 sends a Resource Request message. As was described previously, the Resource Request message is passed by the connectivity layer 41 from the requesting application 52 to the appropriate server 50 to serve the request. The server 50 then fulfills the request. While the server 50 is processing the request it can respond to the requesting application 52 with Indication messages informing the requesting application 52 of the progress of the request, or it can make Consult Requests to the requesting application 52 and receive Inform Responses in reply. The Resource Request transaction ends when the server 50 responds to the application 52 that make the resource request with a Response message.

EXAMPLE 1

FIG. 16 depicts an exemplary Resource Request transaction than involves an application 52 making a Resource Request to the Phone Number Directory (PND) server 50. The PND server 50 actions the request and sends a Response message to the requesting application 52. This ends the resource request transaction.

EXAMPLE 2

FIG. 17 depicts an exemplary Resource Request transaction than involves an application 52 making a Resource Request to the Call server 50. The Call server 50 actions the request. The Call server 50 reports progress of the request to the requesting application 52 by sending Indication messages (e.g., Call Proceeding, Call Alerting, Call Connected, etc.). Finally the Resource Request is completed and the Call server 50 sends a Response (RESP) message to the requesting application 52. This ends the resource request transaction.

EXAMPLE 3

FIG. 18 depicts an exemplary Resource Request transaction than involves an application 52 making a Resource Request to the PND server 50. The PND server 50 actions the request. In actioning the request the PND server 50 discovers that it must check whether to proceed from the requesting application 52, as it must read external memory. The PND server 50 makes a Consult Request (CONS) to the application 52. The application 52 responds to the consulting server 50 with an Inform Response (INF) message giving permission to read from external memory. The PND server 50 can then complete the Resource Request. The PND server 50 sends a Response message to the requesting application 52. This ends the resource request transaction.

An Event Indication transaction starts when a server 50 sends an indication of an event to one or more applications 52 in the form of an Indication message. The application(s) 52 have previously registered to receive indications. The Event Indication is passed from the server 50, where the event occurred, to the application 52. The event indication transaction ends when the Event Indication message is delivered to the application(s) 52 that have registered to receive the Event Indication(s).

EXAMPLE 4

Figure 19:
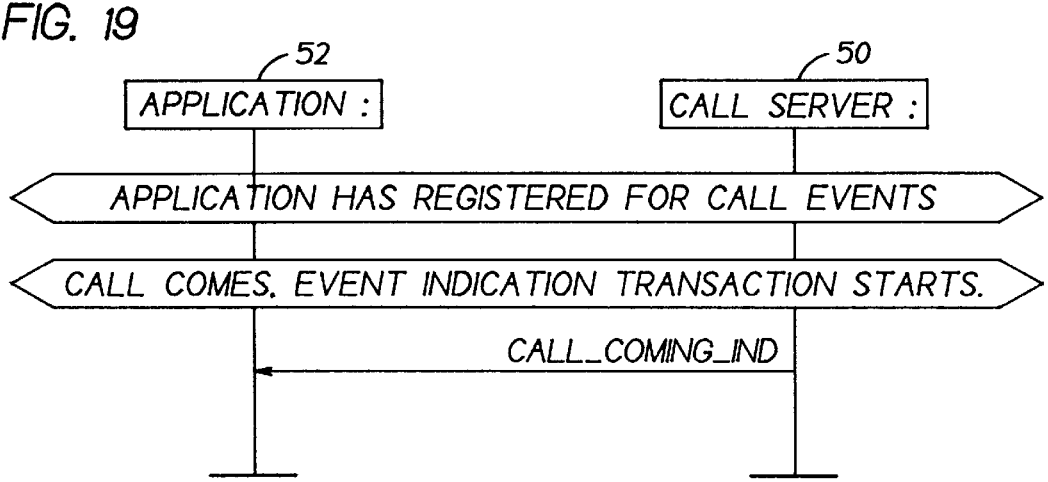
FIG. 19 is an exemplary event indication transaction chart for a case where the Call Server sends a Call_Coming_IND to an application or applications that previously registered to receive event indications from the Call Server.

FIG. 19 depicts an exemplary Event Indication transaction that begins when a server 50 sends a Call_Coming_IND to application(s) 52. The transaction is then complete.

The applications(s) 52 have previously registered to receive event indications from the server 50.

An Event Indication transaction ends after the successful delivery of the Event Indication message to the application 52(s), as in depicted in FIG. 19. It is possible, however, that an Event Indication transaction continues. In this case the transaction is instead an Event Indication transaction with Subsequent Actions.

An application 52 that receives an Event Indication message may wish to react to the Indication message by making a Resource Request, and may also wish to tie the subsequent Resource Request transaction to the Event Indication transaction that it has received. This may true because the server 50 is sending many Event Indications, and the application 52 wants to make it clear to which Indication it is 'replying'. In this case the subsequent Resource Request transaction is considered to be part of the Event Indication transaction with Subsequent Action. The Event Indication transaction with Subsequent Action is considered to end when the server 50 sends the Response Message to the Resource Request made by the application 52.

It should be noted that an application 52 may want to react to the Indication message by making a Resource Request, but it may not wish to tie the Resource Request directly to the Indication message. In this case the subsequent Resource Request is made instead as a regular Resource Request transaction.

EXAMPLE 5

Figure 20:
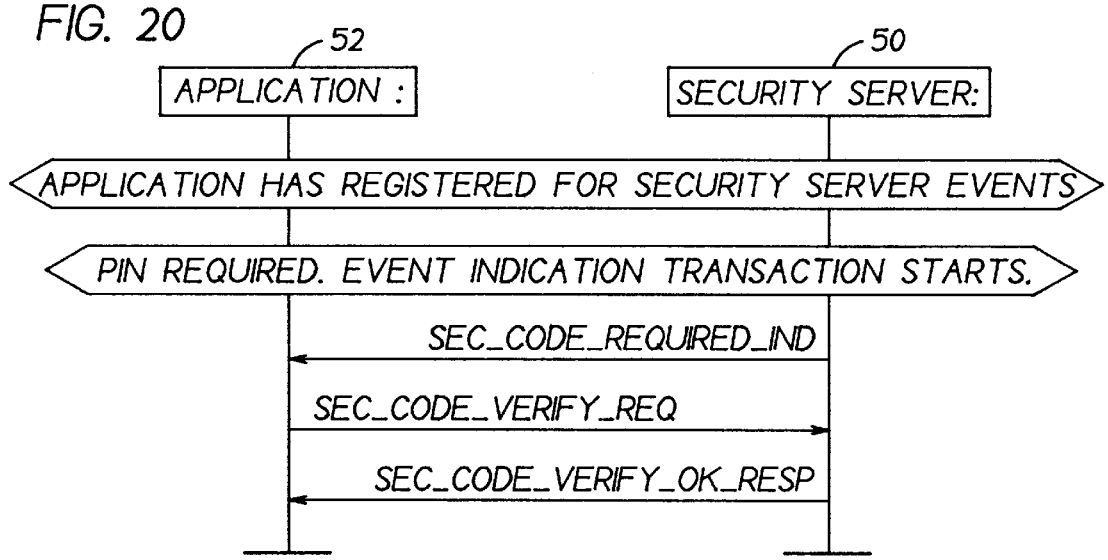
FIG. 20 is an exemplary event indication transaction chart that includes a subsequent action, such as an application making a resource request that is tied to the event indication.

FIG. 20 depicts an exemplary Event Indication with Subsequent Actions transaction that begins when a security (SEC) server 50 sends a SEC_Code_Required_IND message to application(s) 52 which had previously registered to receive Event Indications. One of the applications 52 that receives the Event Indication then makes a Resource Request which is tied to the Event indication. The Resource Request is a SEC_Code_Verify_REQ. The SEC server 50 responds to the requesting application 52 with a Response message (SEC_Code_Verify_OK_RESP). This ends the Event Indication with Subsequent Actions transaction.

A Consult Request transaction starts when a server 50 sends a consult request to an application 52, and the Consult Request is not part of an ongoing Resource Request transaction. The Consult Request message is passed by the connectivity layer 41 from the consulting server 50 to the appropriate application 52. The application 52 performs the necessary actions. The Consult Request transaction ends when the application 52 responds to the server 50 that made the Consult Request with an Inform Response message.

EXAMPLE 6

Figure 21:
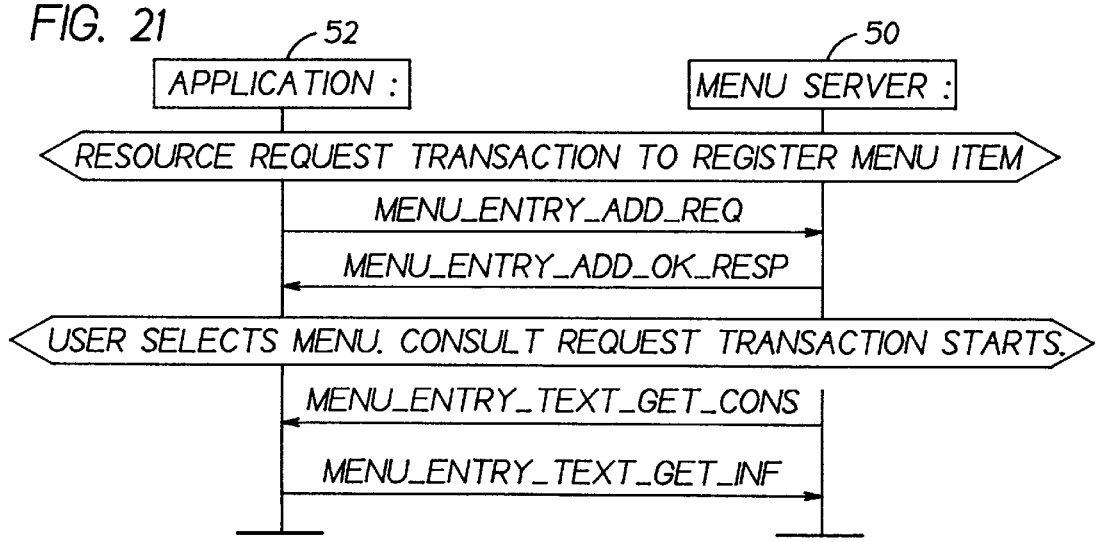
FIG. 21 is an exemplary consult request transaction chart wherein a server sends a consult request to an application, and the consult request is not part of an ongoing resource request transaction.

FIG. 21 depicts an exemplary Consult Request transaction that begins when a menu server 50 sends a Consult Request message to an application 52 that had previously registered to use a service of the menu server 50. The application 52 responds to the Consult Request with an Inform Response to the consulting server 50. This ends the Consult Request transaction. After registering, it can be seen the application 52 sends a MENU_Entry_Add_REQ (a Resource Request) to the menu server 50, and in response receives a MENU_Entry_add_OK_RESP from the menu server 50. After the user selected the menu, such as by interacting with the user interface of the keypad 22 and display 20 of the mobile station 10, the actual Consult Request transaction begins As was described above, each transaction has a unique Transaction ID (UTID). The UTID is used by the entities involved in the transact ion to match messages to particular transactions. This enables applications 52 and servers 50 to be simultaneously active in more than one transaction with more than one entity, and yet still be able to match Request and Response messages accordingly.

In each transaction one of the communication entities is designated as the originator of the transaction. The originator is responsible for allocating a UTID for the transaction and including the allocated UTID in the first message of the transaction. The originator and the other communicating entity then use the allocated UTID in each subsequent message in that transaction.

The originator is designated depending on the type of transaction that will take place, and is the first entity to communicate in the transaction. The following table shows the originator in each of the transaction types.

| Transaction | Originator |
| --- | --- |
| Resource Request | Requesting application 52 |
| Event Indication | Indicating server 50 |
| Event Indication with Subseguent Actions | Indicating server 50 |
| Consult Request | Consulting server 50 |

Each entity that wishes to communicate through ISI maintains its own UTID count. Whenever an entity allocates a UTID to a transaction it increments its own UTID count and includes it in the Unique Transaction ID field of the message header of the message that initiates a transaction. The UTID is, for example, an 8 bit value. The MSB is used to indicate if the UTID is owned by a client or a server 50. The remaining 7 bits contain the entities' UTID counter value. Entities may all initialize their UTID counter to zero at startup.

An entity can identify a message and the transaction to which it belongs using a combination of the UTID, the address of the other communicating entity, the resource, and the message ID. In most case only a combination of a few of these elements are needed to identify in which transaction a message belongs. The following table shows several examples.

| Transaction | Application identifies using | Server 50 identifies using |
| --- | --- | --- |
| Resource Request | AO UTID + Resource | AO UTID + Address of Sender |
| Event Indication | SO UTID + Resource | SO UTID + Resource |
| Event Indication with Subsequent Actions | SO UTID + Resource | SO UTID + Address of sender |
| Consult Request | SO UTID + Resource | SO UTID + Resource |

Based on the foregoing it can be appreciated that the inventors have described an interface for communication between a radio telephone and one of multiple accessory devices with a choice of several physical connection media (e.g., IR, RF or wire). Characteristics of the invention include the PhoNet interface having two separate layers: (1) the router layer for routing the messages from/to an accessory device, for controlling the interface functionality, and for keeping track of the link status; and (2) a connection layer for converting the router layer messages into a suitable format for the physical connection. The connection layer further comprises (1) the control unit, (2) media modules, and (3) the frame filter. The ISI (Intelligent Service Interface) is a messaging concept that uses the PhoNet interface for message routing. Individual accessory devices having different physical connection types can communicate with each other via PhoNet/ISI. In a similar manner separate software modules of a phone can communicate via PhoNet/ISI. The PhoNet/ISI interface of a phone and PhoNet/ISI of an accessory device have a master/slave relationship. The PhoNet/ISI is an interface architecture that supports modular software architecture, ISA. PhoNet is a universal phone interface for all types of accessories, that typically are connected to a wired or wireless connector of the phone or included in a battery pack. The two distinct layers of PhoNet provide the functionality of a "plug and play" type of operation. New accessory device with a physical connection different from those that the phone is already supporting can be connected to the phone by loading a new media module in the connection layer.

Although described in the context of preferred embodiments, it should be realized that a number of modifications to these teachings may occur to one skilled in the art. By example, the teaching of this invention is not limited to only the specific message formats, protocols, field sizes and field ordering that has been disclosed above. The teachings of this invention are also not limited to only the specified ones of servers, sub-systems, resources, and applications that have been described above. Furthermore, more or less than the FBUS, MBUS and wireless buses 18A–18C can be employed, as can other media types besides wired and wireless. By example, optical fiber links could be used in some applications.

Thus, while the invention has been particularly shown and described with respect to preferred embodiments thereof, it will be understood by those skilled in the art that changes in form and details may be made therein without departing from the scope and spirit of the invention.

What is claimed is:

1. A communications system, comprising a radio unit device that comprises a radio transceiver, a plurality of objects and a plurality of links for transferring messages between said objects, said radio unit device further comprising a message router for receiving system registration requests from objects, said system registration requests comprising an identification of a registering object and addressing information for enabling a message to be sent to said registering object.

2. A communications system as in claim 1, wherein a message includes a logical address of a destination for said message, said router being responsive to a receipt of a message for translating the logical address to at least one physical address and for directing the message over a link to the at least one physical address.

3. A communications system as in claim 1, wherein a message includes a functional description of a destination for said message, said router being responsive to a receipt of a message for translating the functional description to at least one physical address and for directing the message over a link to the at least one physical address.

4. A communications system as in claim 1, wherein said router is responsive to a request to establish a connection for setting up a direct communications pipe between two of said plurality of objects, using one of said plurality of links.

5. A communications system as in claim 1, and further comprising at least one external device comprised of at least one external object that is coupled to said radio unit device through at least one of said plurality of links, said message router being operable for receiving a registration request from at least one external device and from said at least one external object and for recording at least one of an identity of a preferred link specified by the registration request or an identity of a link over which the registration request was received.

6. A communications system as in claim 1, wherein at least one type of registration request includes a link preference for a registering object.

7. A communications system, comprising a radio unit device that includes a main message router, a plurality of internal objects, and a plurality of links at least one which is for passing messages between said internal objects, said communications system further comprising at least one external device that includes a message sub-router and at least one external object, said at least one external device being bidirectionally coupled to at least one of said plurality of links, said main message router for receiving registration requests from said internal objects, said at least one external device, and said at least one external object, said registration requests comprising an identification of a registering object or device and addressing information for enabling a message to be sent to said registering object or device.

8. A communications system as in claim 7, wherein one of said messages is a Resource Request message for indicating a desire to obtain access to a resource of said radio unit device or said external device, and wherein another of said messages is a Response message that is sent from a server responsible for the resource to the originator of said Resource Request message.

9. A communications system as in claim 8, wherein one of said messages is an Indication message that is sent from said server responsible for said resource for indicating one of an event or a status associated with said resource.

10. A communications system as in claim 8, wherein one of said messages is a Consult Request message that is sent from said server responsible for said resource for requesting additional information in order to complete an action dictated by said Resource Request message.

11. A communications system as in claim 10, wherein one of said messages is an Inform Response message that is sent from the originator of said Resource Request message in response to receiving said Consult Request message.

12. A communications system as in claim 8, wherein said Resource Request message is sent by one of an application or a server.

13. A communications system as in claim 8, wherein one of said messages is an Indication message that is sent from said server responsible for said resource for indicating one of an event or a status associated with said resource, wherein another one of said messages is a Consult Request message that is sent from said server responsible for said resource for requesting additional information in order to complete an action dictated by said Resource Request message, and wherein said Indication message and said Consult Request message each contain a destination address field that is obtained from an address field of said Resource Request message.

14. A communications system as in claim 13, wherein said Indication message and said Consult Request message each further contain a unique transaction identification field that is obtained from a unique transaction identification field of said Resource Request message.

15. A communications system as in claim 8, wherein one of said messages is an Indication message that is sent from said server responsible for said resource for indicating an occurrence of an event associated with said resource, said Indication message being sent to at least one destination that has previously registered a request to be informed of an occurrence of the event.

16. A communications system as in claim 7, wherein at least one registration request is comprised of a link preference for a registering device or object.

17. A communications system, comprising a radio unit that includes a plurality of applications, a plurality of servers each associated with a resource of said radio unit, and a connectivity layer interposed between said plurality of applications and said plurality of servers for selectively coupling said applications to said servers, said system further comprising at least one accessory device that is coupled to said radio unit through said connectivity layer, said at least one accessory device comprising at least one application and at least one server associated with a resource of said accessory device, wherein at least one of an application or a server of said radio unit can be coupled to said at least one server of said accessory device or a server of said radio unit through said connectivity layer in response to a Resource Request message sent from said at least one application or server of said radio unit, said Resource Request message being routed through said connectivity layer, said radio unit further comprising a message router coupled to said connectivity layer for routing messages between applications and servers and for receiving registration requests from objects and devices requiring registration and for providing information about registered objects and devices.

18. A communications system as in claim 17, wherein at least one of said plurality of servers is a panel server coupled to at least one panel providing a user interface to said radio unit.

19. A communications system as in claim 17, wherein said system includes an event server function for providing indications of events to predetermined ones of said applications that have registered to receive said indications.

20. A communications system as in claim 17, wherein at least one of said plurality of servers is a system mode controller for providing said radio unit with a capability to be bidirectionally coupled to individual ones of a plurality of different radio communication systems.

21. A communications system as in claim 17, wherein another message is a Response message that is sent from said server responsible for said resource through said connectivity layer to the application or server that originated said Resource Request message.

22. A communications system as in claim 17, wherein another message is an Indication message that is sent from said server responsible for said resource for indicating one of an event or a status associated with said resource.

23. A communications system as in claim 17, wherein another message is a Consult Request message that is sent from said server responsible for said resource for requesting additional information in order to complete an action dictated by said Resource Request message.

24. A communications system as in claim 23, wherein another message is an Inform Response message that is sent from the originator of said Resource Request message in response to receiving said Consult Request message.

25. A communications system, comprising a radio unit operable with at least one type of wireless communications network, said radio unit being comprised of a plurality of applications, a plurality of communication media, a master router layer, and a connection layer, said master router layer and said connection layer being interposed between said plurality of applications and said communication media, said master router layer being responsive to messages received from said plurality of applications for routing at least some of said messages through said connection layer and at least one of said communication media to an external application coupled to said radio unit through a slave router layer, said master router layer being responsive to registration request messages from requesting entities for registering said requesting entities, said registration request messages comprising an identification of a registering entity and addressing information for enabling a message to be sent to said registering entity.

26. A communications system as in claim 25, wherein said master router is responsive to a receipt of a registration request message for dynamically assigning an address to an entity requesting registration.

27. An accessory device for being bidirectionally coupled to a radio unit device through at least one of a wireless interface or a wired interface, the radio unit device comprising a plurality of resources, said accessory device comprising at least one application that is coupled to said wireless or wired interface through a message router layer for transmitting at least one of a Resource Request message or a Resource Request Response message to said radio unit device and via a message router of said radio unit device to a resource server associated with a particular radio unit device resource, whereby the at least one application is enabled to operate with one of said plurality of radio unit device resources, wherein said message router of said radio unit device receives registration requests from radio unit device resources for enabling a registering resource to be identified and for enabling a message to be sent to said registering resource.

28. A radiotelephone, comprising:

a radio frequency transceiver;

a plurality of devices;

a plurality of links for transferring messages between said devices; and a message router for receiving registration messages from devices and for replying with registration acknowledgement messages, wherein a registration message comprises a device type identifier; a message identifier; a preferred device number to be assigned, if available; and information describing available links; and wherein a registration acknowledgement message comprises the previously received device type identifier; the previously received message identifier; an assigned device number; and information describing available links.

* * * * *